US012656489B2

(12) United States Patent
Combs et al.

(10) Patent No.: US 12,656,489 B2
(45) Date of Patent: Jun. 16, 2026

(54) STEERING ASSEMBLIES AND ASSOCIATED METHODS

(71) Applicant: Navico, Inc., Tulsa, OK (US)

(72) Inventors: Neal S. Combs, Osteen, FL (US); Jeremiah D. Clark, Tulsa, OK (US); Christopher D. Crawford, Bixby, OK (US); Jayme Caspall, Tulsa, OK (US)

(73) Assignee: Navico, Inc., Tulsa, OK (US)

( * ) Notice: Subject to any disclaimer, the term of this patent is extended or adjusted under 35 U.S.C. 154(b) by 416 days.

(21) Appl. No.: 17/704,268

(22) Filed: Mar. 25, 2022

(65) Prior Publication Data

US 2022/0373678 A1 Nov. 24, 2022

Related U.S. Application Data

(63) Continuation-in-part of application No. 17/326,409, filed on May 21, 2021, now Pat. No. 12,282,121.

(51) Int. Cl.
  *G05D 1/43* (2024.01)
  *B63H 21/21* (2006.01)
  (Continued)

(52) U.S. Cl.
  CPC ............. *G01S 15/93* (2013.01); *B63H 21/21* (2013.01); *G01S 7/521* (2013.01); *G01S 7/56* (2013.01);
  (Continued)

(58) Field of Classification Search
  CPC . G01S 15/93; G01S 7/521; G01S 7/56; G01S 15/89; B63H 21/21; B63H 2021/216; G05D 1/0206
  See application file for complete search history.

(56) References Cited

U.S. PATENT DOCUMENTS 2,877,733 A 3/1959 Harris
3,598,947 A 8/1971 Osborn
(Continued)

FOREIGN PATENT DOCUMENTS

CA 2887031 A1 10/2015
CA 2984303 C 8/2022
(Continued)

OTHER PUBLICATIONS

"Minn Kota Riptide ST Foot Pedal Accessory User Manual;" retrieved Dec. 7, 2017 from file:///C:/Users/PForbes/Downloads/2377123rc_RT_ST_Foot_Pedal_Manual.pdf.; 4 pages.
(Continued)

*Primary Examiner* — Abdallah Abulaban
(74) *Attorney, Agent, or Firm* — Nelson Mullins Riley & Scarborough LLP

(57) ABSTRACT

A sonar system is provided including a sonar assembly configured to attach to a motor assembly of a watercraft or a watercraft. The sonar assembly includes sonar transducer element(s) that transmit sonar beam(s). The sonar system includes a display, processor(s), and a steering assembly configured to cause rotation of the sonar assembly or the motor assembly. The sonar system includes a memory including computer program code that causes the processor (s) to cause the sonar transducer element(s) to emit sonar beam(s), receive sonar return data from a coverage volume of the sonar transducer element(s), generate a sonar image of the coverage volume based on the sonar return data, receive an input from a user, determine a target in the underwater environment based on the input, and cause the steering assembly to adjust the coverage volume to maintain the target within the coverage volume as the watercraft moves relative to the target.

17 Claims, 25 Drawing Sheets

(51) Int. Cl.

| | | |
|---|---|---|
| *G01S 7/521* | (2006.01) | |
| *G01S 7/56* | (2006.01) | |
| *G01S 15/89* | (2006.01) | |
| *G01S 15/93* | (2020.01) | |
| *G05D 1/00* | (2006.01) | |

(52) U.S. Cl.
CPC ............ *G01S 15/89* (2013.01); *G05D 1/0206* (2013.01); *G05D 1/43* (2024.01); *B63H 2021/216* (2013.01)

(56) References Cited

U.S. PATENT DOCUMENTS

| | | | |
|---|---|---|---|
| 3,807,345 | A | 4/1974 | Peterson |
| 5,293,351 | A | 3/1994 | Noponen |
| 5,420,828 | A | 5/1995 | Geiger |
| 5,892,338 | A | 4/1999 | Moore et al. |
| 6,054,831 | A | 4/2000 | Moore et al. |
| 6,181,644 | B1 | 1/2001 | Gallagher |
| 6,325,684 | B1 | 12/2001 | Knight |
| 6,447,347 | B1 | 9/2002 | Steinhauser |
| 6,504,794 | B2 | 1/2003 | Haase et al. |
| 6,507,164 | B1 | 1/2003 | Healey et al. |
| 6,524,144 | B2 | 2/2003 | Pasley |
| 6,661,742 | B2 | 12/2003 | Hansen |
| 6,678,589 | B2 | 1/2004 | Robertson et al. |
| 6,868,360 | B1 | 3/2005 | Olstad et al. |
| 6,870,794 | B2 | 3/2005 | Healey |
| 6,899,574 | B1 | 5/2005 | Kalis et al. |
| 6,902,446 | B1 | 6/2005 | Healey |
| 6,909,946 | B1 | 6/2005 | Kabel et al. |
| 6,919,704 | B1 | 7/2005 | Healey |
| 7,004,804 | B2 | 2/2006 | Bernloehr et al. |
| 7,190,636 | B1 | 3/2007 | Depaola |
| 7,195,526 | B2 | 3/2007 | Bernloehr et al. |
| 7,268,703 | B1 | 9/2007 | Kabel et al. |
| 7,303,595 | B1 | 12/2007 | Janitz |
| 7,371,218 | B2 | 5/2008 | Walston et al. |
| 7,430,461 | B1 | 9/2008 | Michaels |
| 7,452,251 | B2 | 11/2008 | Boebel |
| 7,538,511 | B2 | 5/2009 | Samek |
| D594,034 | S | 6/2009 | Bernloehr et al. |
| 7,542,376 | B1 | 6/2009 | Thompson et al. |
| 7,633,431 | B1 | 12/2009 | Wey |
| 7,722,417 | B2 | 5/2010 | Bernloehr et al. |
| 7,889,600 | B2 | 2/2011 | Thompson et al. |
| 8,106,617 | B1 | 1/2012 | Holley |
| 8,195,084 | B2 | 6/2012 | Xiao |
| 8,221,175 | B2 | 7/2012 | Mynster |
| 8,305,844 | B2 | 11/2012 | DePasqua |
| 8,645,012 | B2 | 2/2014 | Salmon et al. |
| 8,761,976 | B2 | 6/2014 | Salmon et al. |
| 8,814,129 | B2 | 8/2014 | Todd et al. |
| 8,879,359 | B2 | 11/2014 | DePasqua |
| 8,888,065 | B2 | 11/2014 | Logan |
| 8,896,480 | B1 | 11/2014 | Wilson et al. |
| 8,991,280 | B2 | 3/2015 | Wireman |
| 9,127,707 | B1 | 9/2015 | Huntley |
| 9,132,900 | B2 | 9/2015 | Salmon et al. |
| 9,135,731 | B2 | 9/2015 | Lauenstein et al. |
| 9,160,210 | B2 | 10/2015 | Perry |
| 9,162,743 | B1 | 10/2015 | Grace et al. |
| 9,201,142 | B2 | 12/2015 | Antao |
| 9,278,745 | B2 | 3/2016 | Kooi, Jr. et al. |
| 9,290,256 | B1 | 3/2016 | Wireman et al. |
| 9,296,455 | B2 | 3/2016 | Bernloehr et al. |
| 9,322,915 | B2 | 4/2016 | Betts et al. |
| 9,354,311 | B2 | 5/2016 | Chen et al. |
| 9,394,040 | B2 | 7/2016 | Grace et al. |
| 9,459,350 | B2 | 10/2016 | Betts et al. |
| 9,459,356 | B2 | 10/2016 | Lee et al. |
| 9,505,477 | B2 | 11/2016 | Grace et al. |
| 9,507,562 | B2 | 11/2016 | Bailey |
| 9,594,375 | B2 | 3/2017 | Jopling |
| 9,596,839 | B2 | 3/2017 | Bailey |
| 9,676,462 | B2 | 6/2017 | Bernloehr et al. |
| 9,746,874 | B2 | 8/2017 | Johnson et al. |
| 9,758,222 | B2 | 9/2017 | Grace et al. |
| 9,784,825 | B2 | 10/2017 | Brown et al. |
| 9,812,118 | B2 | 11/2017 | Matson et al. |
| 9,836,129 | B2 | 12/2017 | Clark |
| 9,947,309 | B2 | 4/2018 | Stokes et al. |
| 10,012,731 | B2 | 7/2018 | Pelin et al. |
| 10,025,312 | B2 | 7/2018 | Langford-Wood |
| 10,061,025 | B2 | 8/2018 | Kirmani |
| 10,107,908 | B2 | 10/2018 | Betts et al. |
| 10,114,119 | B2 | 10/2018 | Horner et al. |
| 10,114,470 | B2 | 10/2018 | Clark |
| 10,203,403 | B2 | 2/2019 | Fabrizio et al. |
| 10,241,200 | B2 | 3/2019 | Sayer et al. |
| 10,247,823 | B2 | 4/2019 | Brown et al. |
| 10,281,576 | B2 | 5/2019 | Depasqua |
| 10,310,062 | B2 | 6/2019 | Coleman et al. |
| 10,311,715 | B2 | 6/2019 | Jopling |
| 10,324,175 | B2 | 6/2019 | Laster |
| 10,325,582 | B2 | 6/2019 | Antao et al. |
| 10,451,732 | B2 | 10/2019 | Laster |
| 10,460,484 | B2 | 10/2019 | Hovland et al. |
| 10,514,451 | B2 | 12/2019 | Brown et al. |
| 10,545,226 | B2 | 1/2020 | Wigh et al. |
| 10,545,235 | B2 | 1/2020 | Pelin et al. |
| 10,684,368 | B2 | 6/2020 | Pelin et al. |
| 10,723,428 | B1 | 7/2020 | Vicari et al. |
| 10,890,660 | B2 | 1/2021 | Wigh et al. |
| 11,059,556 | B2 | 7/2021 | Ahlgren |
| 11,061,136 | B2 | 7/2021 | Abbas et al. |
| 11,217,216 | B2 | 1/2022 | Vance |
| 11,370,516 | B2 | 6/2022 | Ridl |
| 11,525,907 | B2 | 12/2022 | Wigh et al. |
| 11,536,820 | B2 | 12/2022 | Wigh et al. |
| 2003/0191562 | A1 | 10/2003 | Robertson et al. |
| 2003/0203684 | A1 | 10/2003 | Healey |
| 2003/0214483 | A1 | 11/2003 | Hammer et al. |
| 2003/0214880 | A1 | 11/2003 | Rowe |
| 2005/0255761 | A1 | 11/2005 | Bernloehr et al. |
| 2006/0116031 | A1 | 6/2006 | Bernloehr et al. |
| 2009/0037040 | A1 | 2/2009 | Salmon et al. |
| 2009/0227158 | A1 | 9/2009 | Bernloehr et al. |
| 2010/0014386 | A1* | 1/2010 | Thompson .............. G01S 15/89 367/103 |
| 2012/0014220 | A1 | 1/2012 | DePasqua |
| 2012/0015566 | A1 | 1/2012 | Salmon |
| 2012/0060733 | A1 | 3/2012 | Maki et al. |
| 2012/0204467 | A1 | 8/2012 | Palmer et al. |
| 2012/0232719 | A1 | 9/2012 | Salmon et al. |
| 2012/0299764 | A1 | 11/2012 | Haneda et al. |
| 2013/0044569 | A1 | 2/2013 | DePasqua |
| 2013/0215719 | A1 | 8/2013 | Betts et al. |
| 2014/0203162 | A1 | 7/2014 | Logan |
| 2014/0249698 | A1 | 9/2014 | Salmon et al. |
| 2014/0269164 | A1 | 9/2014 | Betts et al. |
| 2014/0269192 | A1* | 9/2014 | Proctor ................... G01S 15/96 29/592.1 |
| 2014/0277851 | A1 | 9/2014 | Grace et al. |
| 2014/0336854 | A1 | 11/2014 | Salmon et al. |
| 2015/0016130 | A1 | 1/2015 | Davis et al. |
| 2015/0063059 | A1 | 3/2015 | DePasqua |
| 2015/0063060 | A1 | 3/2015 | DePasqua |
| 2015/0151824 | A1 | 6/2015 | Wireman |
| 2015/0346729 | A1 | 12/2015 | Grace et al. |
| 2016/0016651 | A1 | 1/2016 | Anderson et al. |
| 2016/0253150 | A1 | 9/2016 | Williams et al. |
| 2017/0038460 | A1 | 2/2017 | Clark |
| 2017/0285167 | A1 | 10/2017 | Proctor et al. |
| 2017/0371039 | A1 | 12/2017 | Clark et al. |
| 2018/0244361 | A1 | 8/2018 | Laster |
| 2018/0288990 | A1 | 10/2018 | Laster et al. |
| 2018/0329056 | A1 | 11/2018 | Smith et al. |
| 2018/0365246 | A1 | 12/2018 | Laster et al. |
| 2019/0064348 | A1* | 2/2019 | Clark ...................... G01S 15/96 |
| 2019/0072951 | A1* | 3/2019 | Clark ...................... B64D 47/08 |
| 2019/0176952 | A1 | 6/2019 | Clark et al. |
| 2019/0176953 | A1 | 6/2019 | Clark et al. |
| 2019/0219692 | A1 | 7/2019 | Depasqua |

(56) References Cited

U.S. PATENT DOCUMENTS

| | | | |
|---|---|---|---|
| 2019/0265354 A1 | 8/2019 | Antao et al. | |
| 2019/0331779 A1 | 10/2019 | Sandretto | |
| 2020/0070943 A1 | 3/2020 | Clark et al. | |
| 2020/0072953 A1 | 3/2020 | Wigh et al. | |
| 2020/0103512 A1 | 4/2020 | Brown et al. | |
| 2020/0256967 A1 | 8/2020 | Wigh et al. | |
| 2020/0271782 A1 | 8/2020 | Rolt et al. | |
| 2020/0401143 A1* | 12/2020 | Johnson | G01C 21/203 |
| 2021/0056944 A1 | 2/2021 | Vance | |
| 2021/0141086 A1 | 5/2021 | Sloss et al. | |
| 2021/0255627 A1 | 8/2021 | Snyder et al. | |
| 2021/0278514 A1 | 9/2021 | Hughes | |
| 2022/0108677 A1 | 4/2022 | Vance | |
| 2022/0120882 A1 | 4/2022 | Coleman et al. | |
| 2022/0381891 A1 | 12/2022 | Roland et al. | |

FOREIGN PATENT DOCUMENTS

| | | | |
|---|---|---|---|
| CN | 109 471 116 A | 3/2019 | |
| EP | 2 602 639 A1 | 6/2013 | |
| EP | 1 891 461 B1 | 5/2014 | |
| EP | 3170021 A1 | 5/2017 | |
| EP | 3315993 A1 | 5/2018 | |
| EP | 3171200 B1 | 6/2021 | |
| GB | 2 421 312 A | 6/2006 | |
| KR | 2018096482 A * | 8/2018 | G01S 11/14 |
| WO | WO 89/06368 A1 | 7/1989 | |
| WO | WO 95/28682 A1 | 10/1995 | |
| WO | WO 2013/126761 A1 | 8/2013 | |
| WO | WO 2014/144471 A1 | 9/2014 | |
| WO | WO 2016/010619 A1 | 1/2016 | |
| WO | WO 2019/129068 A1 | 7/2019 | |
| WO | WO 2020/114107 A1 | 6/2020 | |

OTHER PUBLICATIONS

"Bass Resource The Ultimate Bass Fishing Resource Guide: Bass Fishing Forums Trolling Motor Foot Pedal—Do You Mount to Deck ?;" retrieved Dec. 8, 2017 from https://www.bassresource.com/bass-fishing-forums/topic/190825-trolling-motor-foot-pedal-do-you-mount-to-deck/.

Shepardson; "Google wins U.S. approval for new radar-based motion sensor;" Reuters; Jan. 1, 2019; retrieved Feb. 13, 2020 from https://www.reuters.com/article/us-google-sensor/google-wins-u-s-approval-for-radar-based-hand-motion-sensor-idUSKCN1OVISH.

Feldler; "Teaching With NYT Virtual Reality Across Subjects;" The New York Times; Mar. 28, 2019; retrieved Feb. 13, 2020 from https://www.nytimes.com/2019/03/28/learning/lesson-plans/teaching-with-nyt-virtual-reality-across-subjects.html.

Smolan et al; "The Click Effect;" New York Times VR; retrieved Feb. 13, 2020 from https://www.with.in/watch/CnVHWFg.

Porathe; "3-D Nautical Charts and Safe Navigation; Department of Innovation, Design and Product Development;" Doctoral Dissertation No. 27, Mälardalen University; Jan. 1, 2006; pp. 1-307 (XP055119720).

U.S. Appl. No. 17/371,192 entitled "Trolling Motor Foot Pedal Controlled Sonar Device ;" filed Jul. 9, 2021 in the name of Dustyn P. Pendergraft.

"LiveSweep ( Wired or Wireless Pedal) Mounting Hardware Included;" *Cornfield Crappie Gear*; retrieved Jul. 19, 2021 from https://www.cornfieldcrappiegear.com/product-page/livesweep-wired-pedal-mounting-hardware-included.

"Google Glass;" *Wikipedia*; retrieved Apr. 18, 2013 from http://en.wikipedia.org/wiki/Google_Glass.

"Navico set to GoFree"; May 1, 2012; retrieved Apr. 18, 2013 from http://www.marinebusiness.com.au/archive/navico-set-to-gofree.

Jun. 16, 2014 Search Report and Written Opinion issued in International Patent Application No. PCT/US2014/021133.

"Motor Guide Xi5 Wireless Foot Pedal;" retrieved Dec. 7, 2017 from http://www.motorguide.com/store/accessory/xi5-wireless-foot-pedal0.

"Magic Leap Quick Start Guide;" 2018; retrieved Feb. 13, 2020 from https://assets.ctfassets.net/b173eiperqoo/4H4PJgU9C0GySyie4QeuWE/c7ef230a10147e86173dd9250ce5b064/180606_QSG_277x190mm_PANTONE_v1.pdf.

*Cornfield Crappie Gear*; retrieved Jul. 19, 2021 from https://www.cornfieldcrappiegear.com/.

"The LiveScanner with True Scan Technology;" retrieved Mar. 24, 2022 from https://www.thelivescanner.com/.

Sealock; "Rite-Hite Turret Livescope Mount Review;" Dec. 17, 2020; retrieved Mar. 24, 2022 from https://www.wired2fish.com/electronics/rite-hite-turret-livescope-mount-review/.

*LSMount*, retrieved Mar. 24, 2022 from https://lsmounts.com.

* cited by examiner

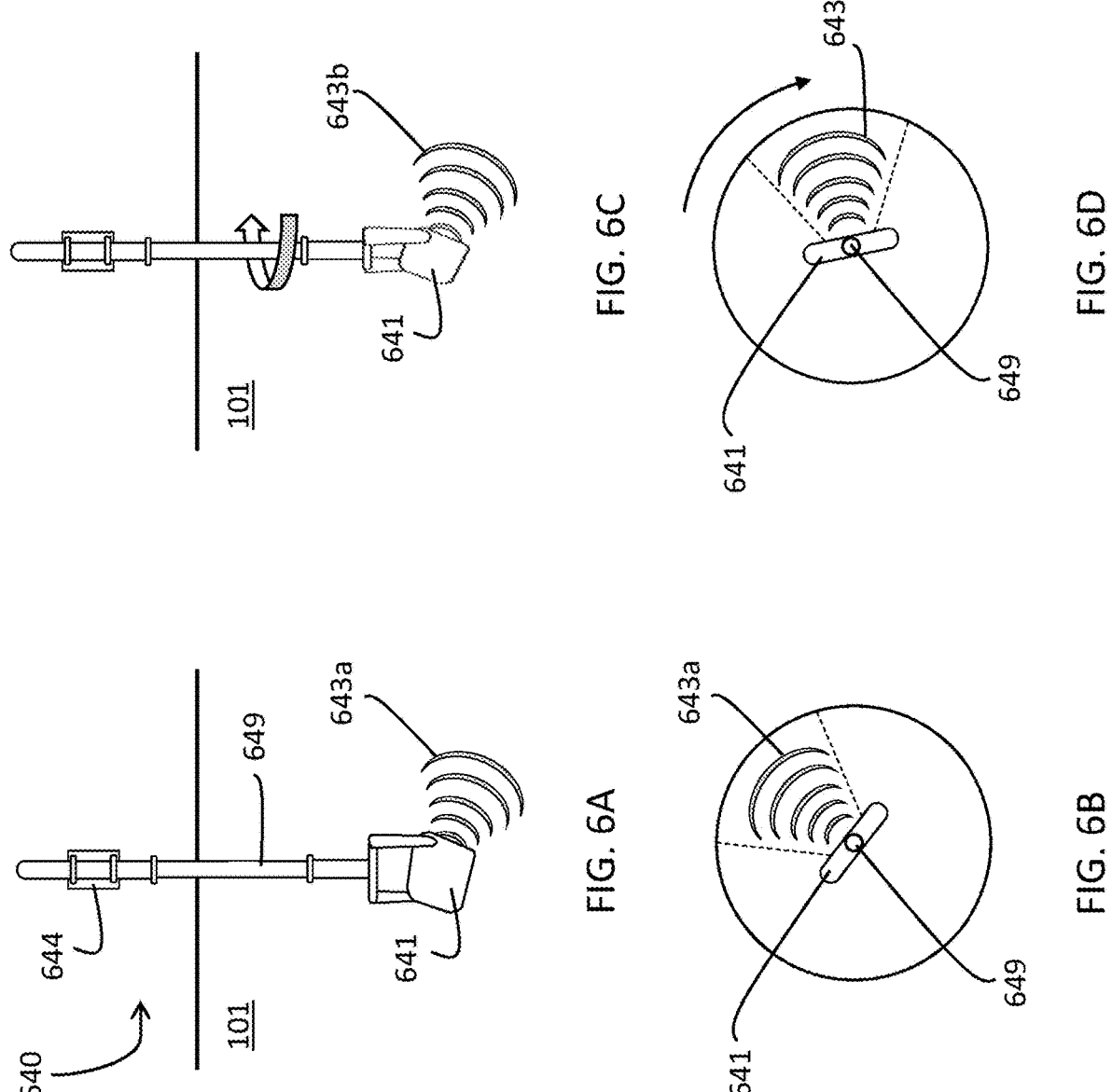

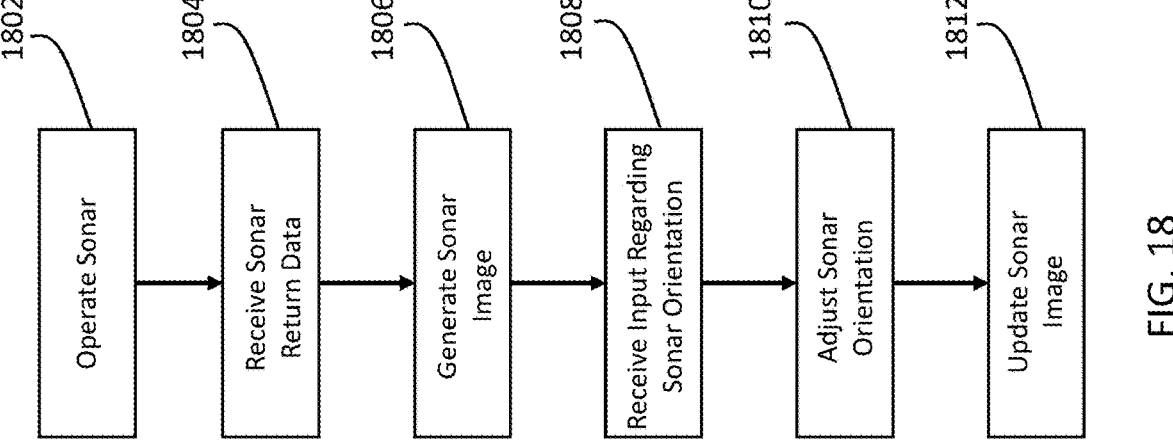
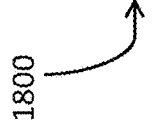
FIG. 18

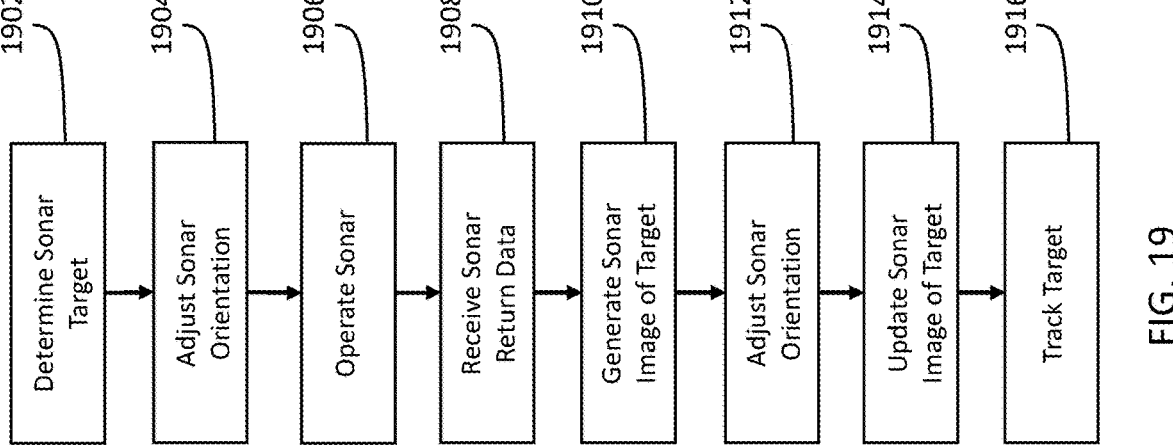
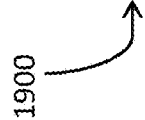
FIG. 19

2000

2002 — Operate Sonar

2004 — Receive Sonar Return Data

2006 — Generate Sonar Image

2008 — Receive Input From User

2010 — Determine Target Based on Input

2012 — Adjust Coverage Volume to Maintain Target in Coverage Volume

2100

2102

Determine Motor Assembly Instructions with Motor Direction and Speed

2104

Determine Steering Assembly Instructions For Adjusting Coverage Volume

2106

Provide Motor Assembly Instructions to the Motor Assembly and by Provide Steering Assembly Instructions to Steering Assembly

2108

Track the Target Through Adjustments to the Motor Assembly and Adjustments to Orientation of Sonar Assembly Using Steering Assembly Instructions

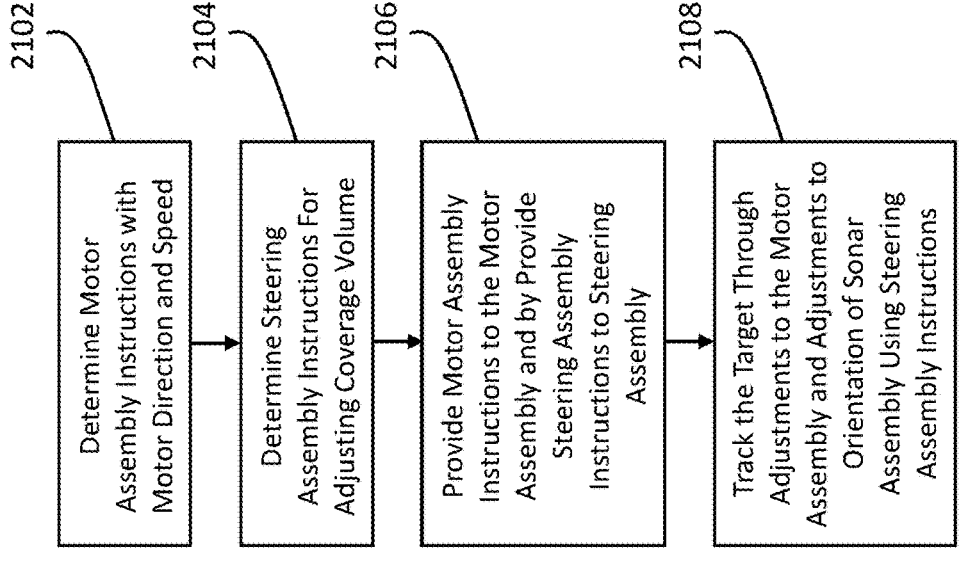

FIG. 21

STEERING ASSEMBLIES AND ASSOCIATED METHODS

CROSS-REFERENCE TO RELATED APPLICATION(S)

This application claims priority to and is a continuation-in-part of U.S. patent application Ser. No. 17/326,409, entitled "Sonar Steering Systems and Associated Methods", filed May 21, 2021, which is hereby incorporated by reference in its entirety.

FIELD OF THE INVENTION

Embodiments of the present invention relate generally to sonar systems for a watercraft and, more particularly, to steering assemblies and associated methods for adjusting the orientation and/or vertical position of the sonar assembly.

BACKGROUND OF THE INVENTION

Sonar (SOund Navigation And Ranging) has long been used to detect waterborne or underwater objects. For example, sonar devices may be used to determine depth and bottom topography, detect fish, locate wreckage, etc. In this regard, due to the extreme limits to visibility underwater, sonar is typically the most accurate way to locate objects underwater. Sonar transducer elements, or simply transducers, may convert electrical energy into sound or vibrations at a particular frequency. A sonar sound beam is transmitted into and through the water and is reflected from objects it encounters (e.g., fish, structure, bottom surface of the water, etc.). The transducer may receive the reflected sound (the "sonar returns") and convert the sound energy into electrical energy. Based on the known speed of sound, it is possible to determine the distance to and/or location of the waterborne or underwater objects. The sonar return signals can also be processed to be presented on a display, giving the user a "picture" or image of the underwater environment.

Conventional sonar systems, however, may make it difficult for a user to understand and/or control the aim of the sonar coverage.

BRIEF SUMMARY OF THE INVENTION

In some systems, the underwater environment being covered by the sonar coverage of a sonar transducer may deviate over time, such as from movement of the watercraft through the water, under its own power, and/or due to the effect of current and wind. Where an angler is relying upon sonar returns to catch fish, departures from the sonar coverage expected or intended by the angler may be frustrating. In some cases, a user may be trying to reach a target (e.g., underwater structure, shipwreck, cliff, area of interest (AOI), etc.) and the user may have trouble maintaining a view of the target in the sonar image as the watercraft approaches, which can lead to frustration and wasted time. Moreover, when a user is undertaking other tasks such as simultaneously operating the watercraft, casting, etc., attempting to recognize and/or adjust the sonar orientation may be especially difficult.

In light of the above, some embodiments of the present teachings provide sonar systems with improved functionality and ease of use for an operator (e.g., an angler). For example, various embodiments provide one or more steering assemblies that may be configured to automatically adjust the directional coverage volume of the sonar system in a hands-free manner—allowing the operator to focus on other tasks. Some embodiments of the present invention may be configured to adjust the directional coverage volume of the sonar transducers to maintain a target within the sonar display despite movement of the watercraft relative to the position of the target. In some embodiments, the coverage volume may be automatically adjusted to maintain the aim of the sonar transducers at a position of a target, where the target is moving through the water, such as a school of fish. In some related aspects, sonar-based systems and methods in accordance with the present teachings may additionally be configured to allow such a target to be selected and tracked. Further, in some embodiments, the system may be configured to enable following and tracking of the target, for example, by providing control signals to the steering assemblies of the sonar system and the motor assembly to propel the watercraft to follow the moving target while maintaining the coverage volume of the sonar to track the target as it moves.

Some steering assemblies described herein allow for a coverage volume of sonar transducer elements to be adjusted to maintain a target within the coverage volume as a watercraft moves relative to the position of the target. The sonar transducer elements may be part of a sonar assembly, and this sonar assembly may be located at various positions on the watercraft. For example, the sonar assembly may be, for example, mounted to the hull of the watercraft (e.g., transom mounted), a motor (e.g., a trolling motor, primary motor, etc.), or a shaft usable from the watercraft (e.g., mounted to the watercraft, holdable by a user of the watercraft, etc.). However, the sonar assembly may be provided at other locations.

In some embodiments, a target may be maintained in a coverage volume by sending commands to a primary motor assembly or a trolling motor assembly, and this may be beneficial to keep the watercraft at a certain location and/or steered in a certain direction (e.g., due to current, due to desired travel of the watercraft, etc.). This feature may be beneficial for fisherman who wish to remain at a specified location or on a specified route to optimize their chances of successfully catching fish. In addition to sending commands to a motor assembly, sonar steering systems may be provided to separately cause orientation control of one or more of the sonar transducer elements. However, since a target may be maintained within a coverage volume by simply sending commands to a motor assembly, sonar transducer elements may be attached to a watercraft separately in some embodiments, and this may minimize the expense of steering assembly connections for directing relative orientation control of the sonar transducer elements.

In an example embodiment, a sonar system is provided for a watercraft in a body of water. The sonar system includes a sonar assembly configured to attach to a watercraft. The watercraft has a direction of travel in a body of water. The sonar assembly includes one or more sonar transducer elements, and the one or more sonar transducer elements are configured to transmit one or more sonar beams into an underwater environment. The sonar system also includes a steering assembly configured to cause rotation of the sonar assembly, and the sonar system also includes a display and one or more processors. Furthermore, the sonar system includes a memory including computer program code configured to, when executed, cause the one or more processors to perform various tasks. These tasks include causing the one or more sonar transducer elements to emit one or more sonar beams into the underwater environment; receiving sonar return data from a coverage volume of the one or more sonar transducer elements; generating a sonar image of the coverage volume of the underwater environment based on the sonar return data; receiving an input from a user directed to a representation of a target in the sonar image; determining a position of the target in the underwater environment based on the input; and causing the steering assembly to adjust the coverage volume, based on the position of the target in the underwater environment, to maintain the target within the coverage volume as the watercraft moves relative to the target.

In some embodiments, the watercraft may include a motor assembly configured to propel the watercraft, and the sonar assembly may be attached to the motor assembly. The computer program code may be configured to, when executed, cause one or more processors to cause the steering assembly to adjust the coverage volume by changing the orientation of the motor assembly relative to the watercraft. The motor assembly may be a primary motor assembly or a trolling motor assembly. Rotation of the sonar assembly may be generated by changing the orientation of the motor assembly relative to the watercraft. In some related embodiments, the computer program code may be configured to, when executed, cause one or more processors to cause the steering assembly to adjust a motor speed of the motor assembly; adjust an orientation of the motor assembly; or adjust a motor speed of a second motor assembly.

In some embodiments, the computer program code may be configured to, when executed, cause one or more processors to cause the steering assembly to adjust the coverage volume by changing the orientation of the one or more sonar transducer elements relative to the motor assembly.

In some embodiments, the steering assembly (or a separate actuator) may be configured to alter the orientation of the coverage volume, such as by causing the sonar transducer element to twitch about the axis to expand the coverage volume. In some embodiments, the computer program code may be configured to, when executed, cause the one or more processors to receive a user input and to activate the actuator (which may be the steering assembly or a separate actuator) upon receiving the user input to cause the sonar transducer elements to twitch about the axis to expand the coverage volume.

In some embodiments, the computer program code may be further configured to, when executed, cause the one or more processors to determine motor assembly instructions to provide to the motor assembly for propelling the watercraft according to a motor direction and a motor speed; determine steering assembly instructions to provide to the steering assembly for adjusting the orientation of the sonar assembly based on the motor assembly instructions; provide the motor assembly instructions to the motor assembly and the steering assembly instructions to the steering assembly; and track the position of the target through adjustments to the motor assembly using motor assembly instructions and through simultaneous adjustments in an orientation of the sonar assembly using steering assembly instructions.

In some embodiments, the target may be a stationary target having an absolute position in the underwater environment. Additionally, the computer program code may be configured to, when executed, cause the one or more processors to save the absolute position in the underwater environment of the target in the memory.

In some embodiments, the target may be at least one of a stationary target or a moving target. Additionally, the computer program code may be configured to, when executed, cause the one or more processors to utilize image processing to redetermine the position of the target in the underwater environment at regularly occurring intervals.

In some embodiments, the computer program code may be configured to, when executed, cause the steering assembly to adjust the coverage volume to maintain the target in the underwater environment at a center of the coverage volume. In some related embodiments, the computer program code may be configured to, when executed, cause the one or more processors to cause the steering assembly to adjust the coverage volume based on an upcoming or a current direction or speed of the watercraft. Additionally, in some related embodiments, computer program code may be configured to, when executed, cause the steering assembly to adjust the coverage volume to maintain the target in the underwater environment at the center of the coverage volume. In doing so, the steering assembly may be configured to adjust an orientation of the motor assembly. Further, the one or more sonar transducer elements may be attached to the motor assembly. The steering assembly may be configured to cause the steering assembly to adjust the coverage volume, based on the position of the target in the underwater environment, to maintain the target within the coverage volume as the watercraft moves relative to the target only when the motor assembly is inactive. Additionally, in some related embodiments, the computer program code may be configured to, when executed, cause the one or more processors to cause the steering assembly to operate in a first mode when a displacement of the position of the target from the center of the coverage volume exceeds a specified threshold and cause the steering assembly to operate in a second mode when a displacement of the position of the target from the center of the coverage volume is less than or equal to the specified threshold. The watercraft may include a motor assembly configured to propel the watercraft. In the first mode, the motor assembly may be active to reduce the displacement of the position of the target, and, in the second mode, the motor assembly may be inactive and the steering assembly may be active to reduce the displacement of the position of the target.

In some embodiments, each of the one or more sonar transducer elements may be configured to operate at a fixed phase shift and vary in frequency so as to beamform multiple sonar return beams between a first range of angles in the fore-to-aft direction and a second range of angles in the fore-to-aft direction. The sonar image may be a two-dimensional live sonar image that is formed of sonar return data from each of the multiple sonar return beams. Further, the sonar return data used to form the two-dimensional live sonar image may be received at substantially a same time by the one or more sonar transducer elements. In some embodiments, a sonar transducer element of the one or more sonar transducer elements may have a first coverage volume, and the memory including computer program code may be configured to, when executed, cause the one or more processors to identify the position of the target in the first coverage volume; determine a relative position of the target in the first coverage volume; and adjust coverage of the sonar beam to a second coverage volume based on the relative position of the target in the first coverage volume. Additionally, in some embodiments, the relative position of the target may include a first displacement, and the first displacement may be a distance between a center of the first coverage volume and the position of the target. Further, a second displacement may be a distance between a center of the second coverage volume and the position of the target, and the second displacement may be less than the first displacement.

In another example embodiment, a sonar system is provided. This sonar system includes a sonar assembly configured to attach to a watercraft having a motor assembly configured to propel the watercraft to travel along a direction of travel in a body of water. The sonar assembly includes one or more sonar transducer elements, and the one or more sonar transducer elements are configured to transmit one or more sonar beams into an underwater environment. The sonar system also includes a steering assembly configured to cause rotation of at least one of the sonar assembly or the motor assembly. The sonar system also includes a display and one or more processors. Furthermore, the sonar system includes a memory including computer program code configured to, when executed, cause the one or more processors to cause the one or more sonar transducer elements to emit one or more sonar beams into the underwater environment; receive sonar return data from a coverage volume of the one or more sonar transducer elements; generate a sonar image of the coverage volume of the underwater environment based on the sonar return data; receive an input from a user directed to a representation of a target in the sonar image; determine a position of the target in the underwater environment based on the input; and cause the steering assembly to adjust the coverage volume, based on the position of the target in the underwater environment, to maintain the target within the coverage volume as the watercraft moves relative to the target.

In some embodiments, the sonar assembly may include a shaft defining a first end and a second end. The first end of the shaft may be attached to the watercraft, and the one or more sonar transducer elements may be attached to the second end of the shaft. The computer program code may be configured to, when executed, cause the one or more processors to cause the steering assembly to adjust the coverage volume to maintain the target within the coverage volume by performing at least one of (i) rotating the one or more sonar transducer elements about a longitudinal axis of the shaft, (ii) tilting the one or more sonar transducer elements, (iii) adjusting the vertical position of the one or more sonar transducer elements within the underwater environment, or (iv) propelling the watercraft using the motor assembly.

In some embodiments, the one or more sonar transducer elements may be attached to a hull of the watercraft. Further, the computer program code may be configured to, when executed, cause the one or more processors to cause the steering assembly to adjust the coverage volume to maintain the target within the coverage volume by performing at least one of (i) tilting the one or more sonar transducer elements, or (ii) propelling the watercraft using the motor assembly.

In another example embodiment, a trolling motor assembly for use on a watercraft that is in a body of water is provided. The trolling motor assembly includes a trolling motor. The trolling motor assembly also includes a sonar assembly including one or more sonar transducer elements, and the one or more sonar transducer elements are configured to transmit one or more sonar beams into an underwater environment. The trolling motor assembly also includes a steering assembly configured to cause rotation of at least one of the sonar assembly or the trolling motor. Furthermore, the trolling motor assembly includes one or more processors and a memory including computer program code configured to, when executed, cause the one or more processors to cause the one or more sonar transducer elements to emit one or more sonar beams into the underwater environment; receive sonar return data from a coverage volume of the one or more sonar transducer elements; generate a sonar image of the coverage volume of the underwater environment based on the sonar return data; and cause the steering assembly to adjust the coverage volume to maintain the target within the coverage volume as the watercraft moves relative to the target. The trolling motor is configured to be attached to the watercraft propel the watercraft to travel along a direction of travel in a body of water.

In another example embodiment, a method for adjusting a coverage volume of a steering assembly on a watercraft that is in a body of water is provided. The method includes providing a sonar system having a sonar assembly with one or more sonar transducer elements, with the sonar assembly being configured to attach to the watercraft; providing a steering assembly configured to cause rotation of the sonar assembly; causing the one or more sonar transducer elements to emit one or more sonar beams into the underwater environment; receiving sonar return data from a coverage volume of the one or more sonar transducer elements; generating a sonar image of the coverage volume of the underwater environment based on the sonar return data; receiving an input from a user directed to a representation of a target in the sonar image; determining a position of the target in the underwater environment based on the input; and causing the steering assembly to adjust the coverage volume, based on the position of the target in the underwater environment, to maintain the target within the coverage volume as the watercraft moves relative to the target.

In another example embodiment, a sonar system for a watercraft in a body of water is provided. The sonar system comprises one or more sonar transducer elements that are configured to transmit one or more sonar beams into an underwater environment, wherein the one or more sonar beams have an initial coverage volume. The sonar system further includes an actuator connected to the one or more sonar transducer elements and configured to cause the sonar transducer element to twitch about an axis to generate an expanded coverage volume. The sonar system further includes a display, one or more processors, and a memory including computer program code configured to, when executed, cause the one or more processors to: cause the one or more sonar transducer elements to emit one or more sonar beams having the initial coverage volume into the underwater environment; activate the actuator to cause the one or more sonar transducer elements to twitch about the axis to generate one or more sonar beams having the expanded coverage volume; receive sonar return data from the expanded coverage volume; and generate a sonar image of the expanded coverage volume of the underwater environment based on the sonar return data.

In some embodiments, the actuator is a steering assembly configured to cause rotation of the one or more sonar transducer elements. In some embodiments, the steering assembly is a primary motor or a trolling motor of the watercraft. In some embodiments, the steering assembly is separate from a primary motor or a trolling motor of the watercraft.

In some embodiments, the computer program code is configured to, when executed, cause the one or more processors to: receive a user input; and activate, upon the user input, the actuator to cause the one or more sonar transducer elements to twitch about the axis to generate the expanded coverage volume. In some embodiments, the user input is at least one of a request to increase coverage or a request to find a target.

In some embodiments, the computer program code is configured to, when executed, cause the one or more processors to: receive an indication indicating at least one of that the target cannot be identified in the initial coverage volume, that the watercraft has entered into an area for which the memory does not contain any data, or that the target has been identified; and activate, upon receiving the indication, the actuator to cause the one or more sonar transducer elements to twitch about the axis to generate the expanded coverage volume.

In some embodiments, the computer program code is configured to, when executed, cause the one or more processors to activate the actuator periodically at regular intervals to cause the one or more sonar transducer elements to twitch about the axis to generate the expanded coverage volume.

Additional example embodiments of the present invention include methods, systems, and computer program products associated with various embodiments described herein.

BRIEF DESCRIPTION OF THE DRAWINGS

Figure 1:
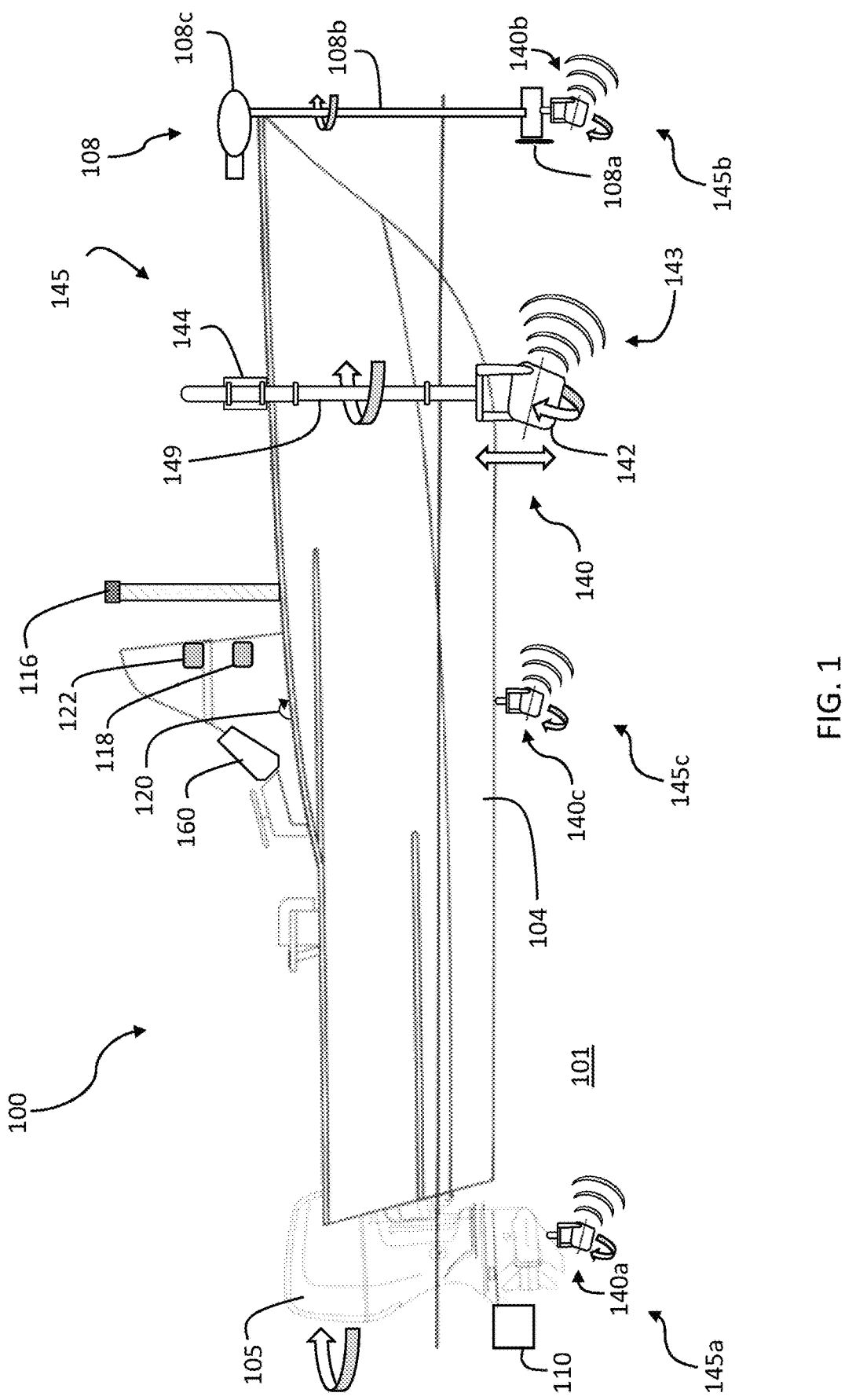
Figures 2A, 2B:
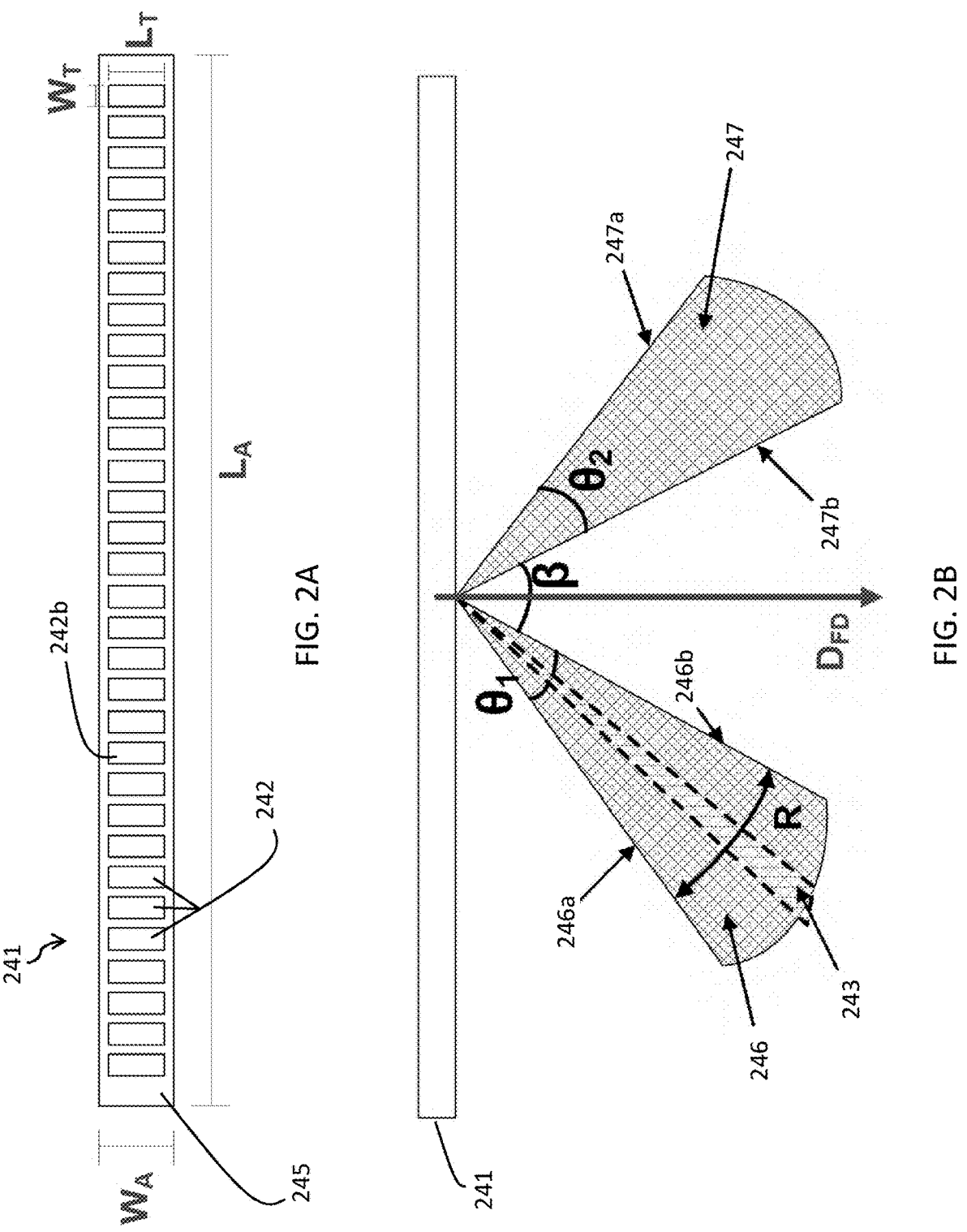
Figure 2C:
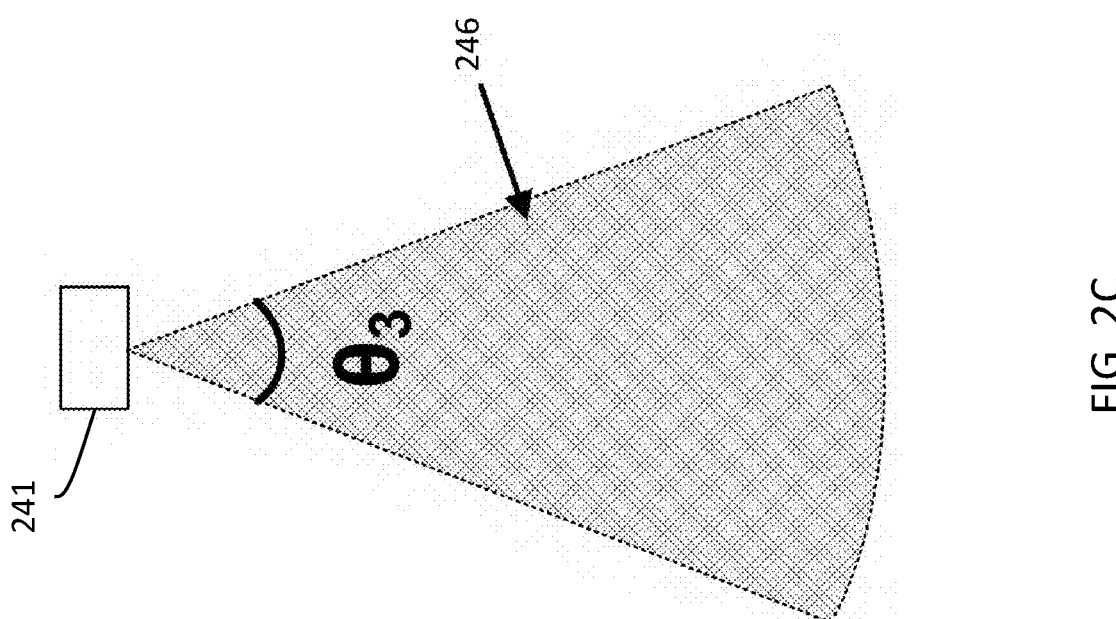
Figure 2D:
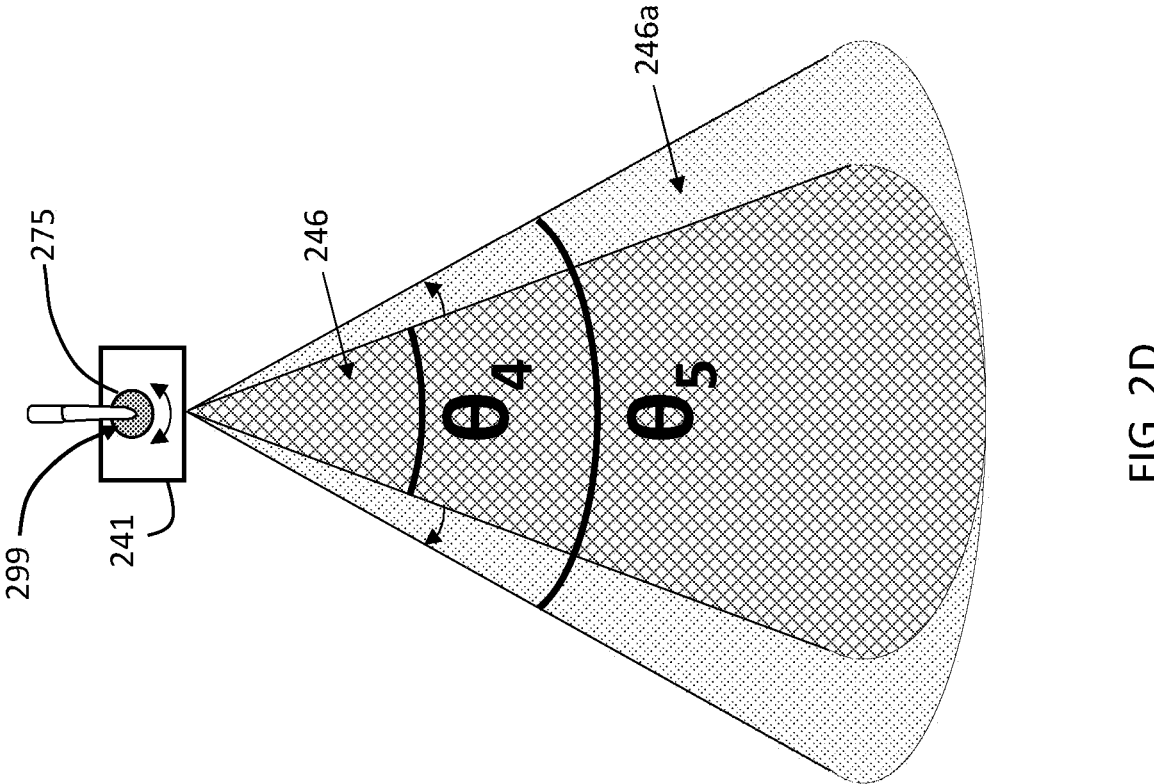
Figure 3:
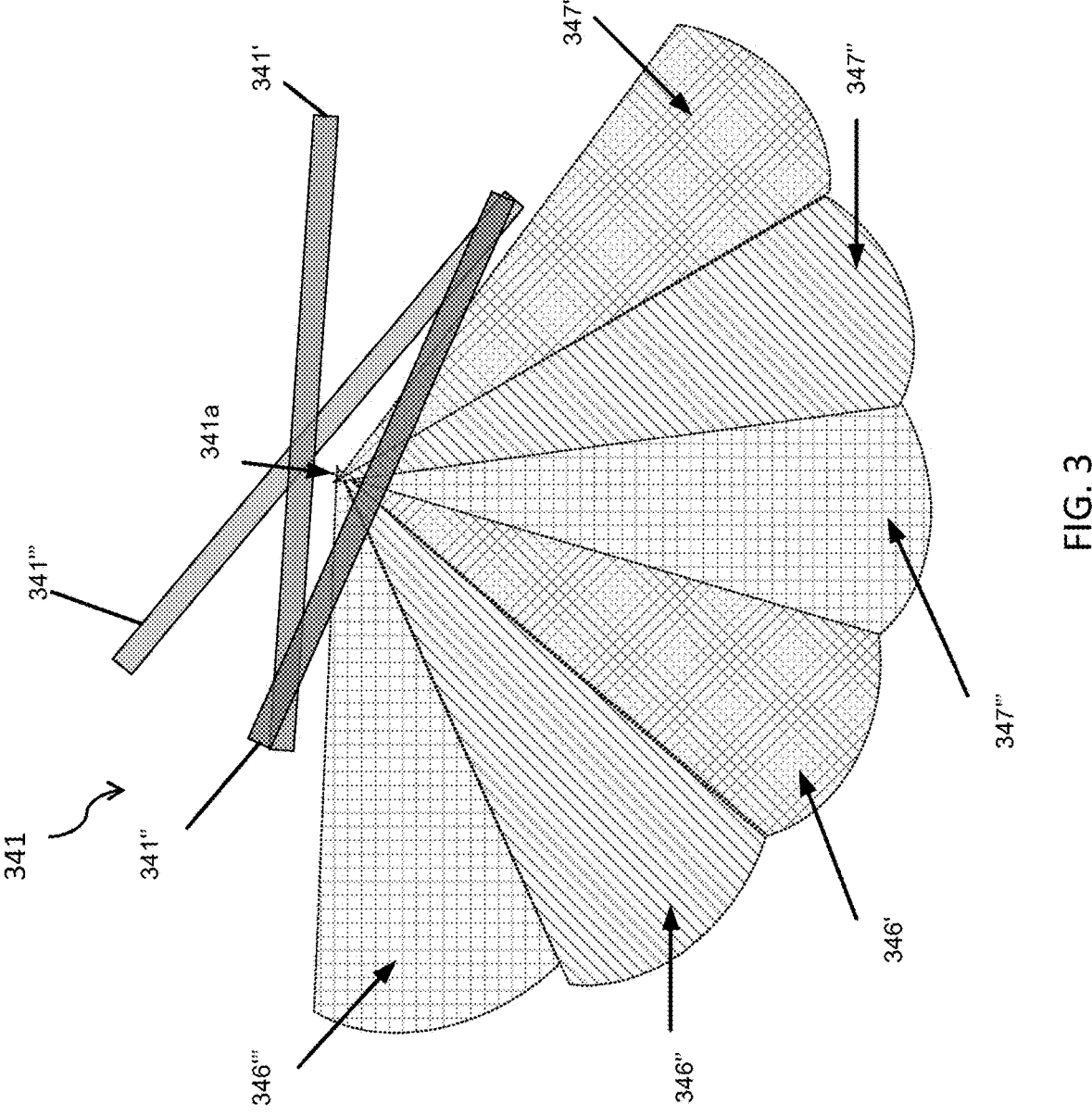
Figure 4:
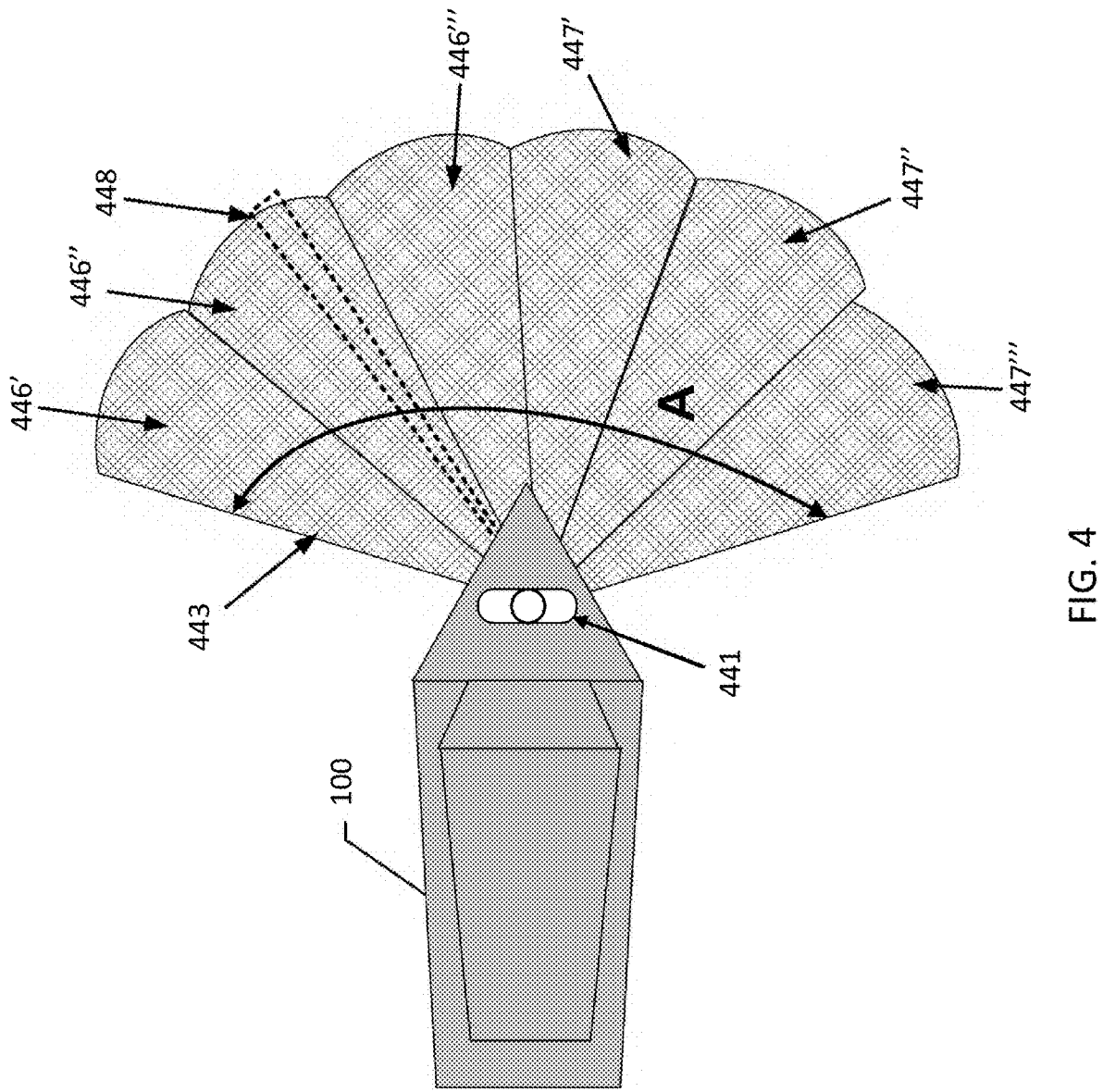
Figure 5:
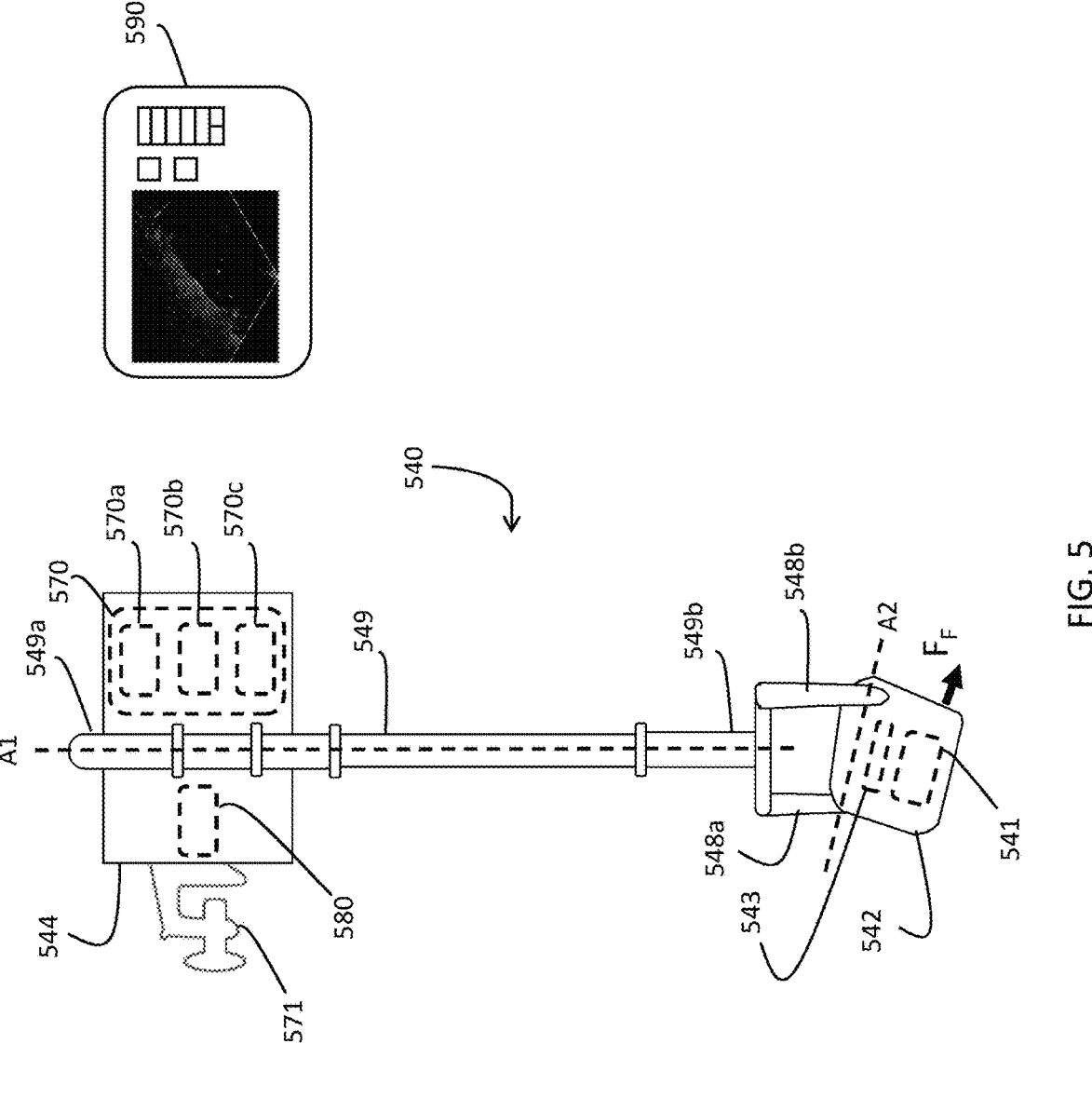
Figures 7A, 7B, 8A, 8B:
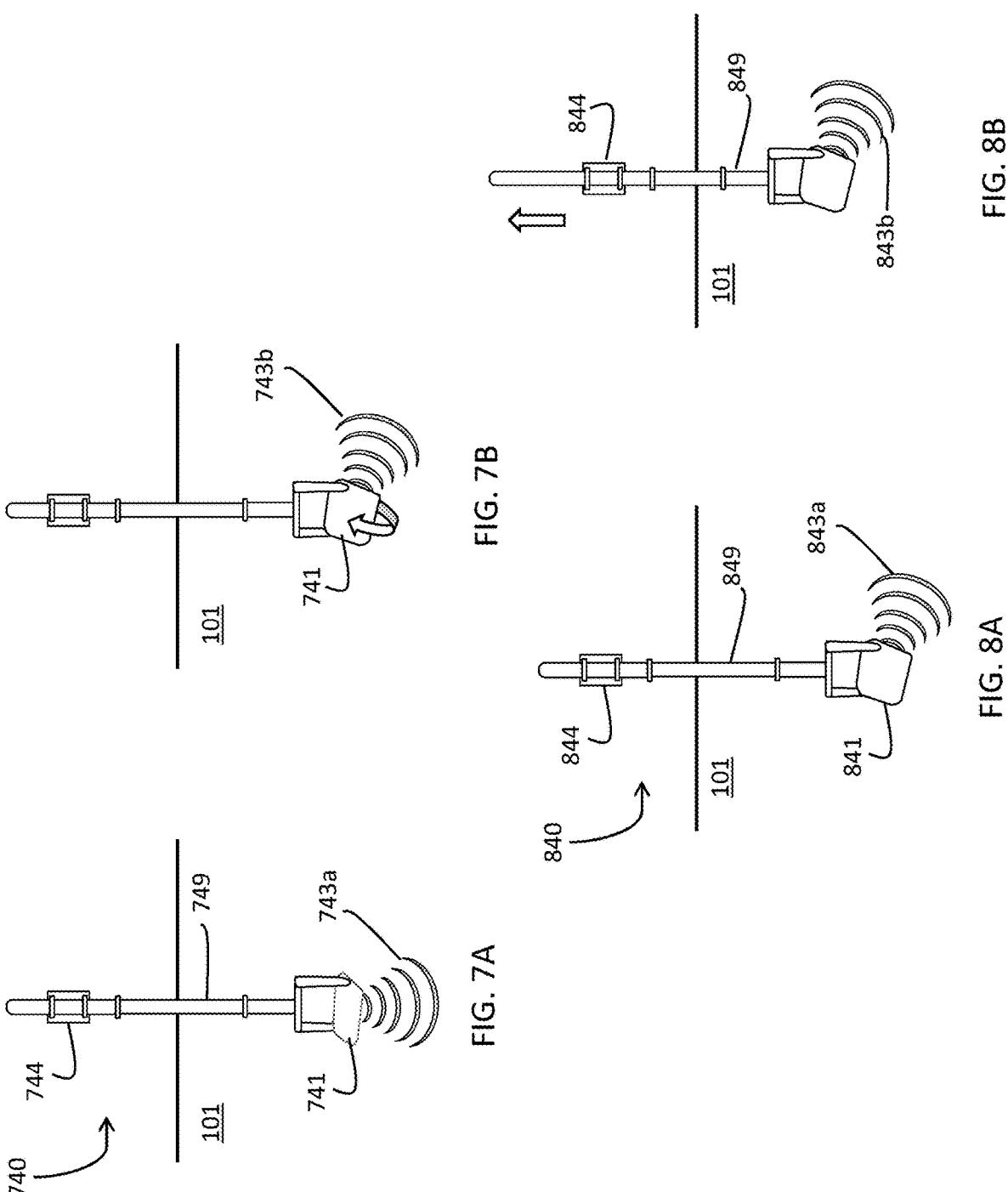
Figure 9B:
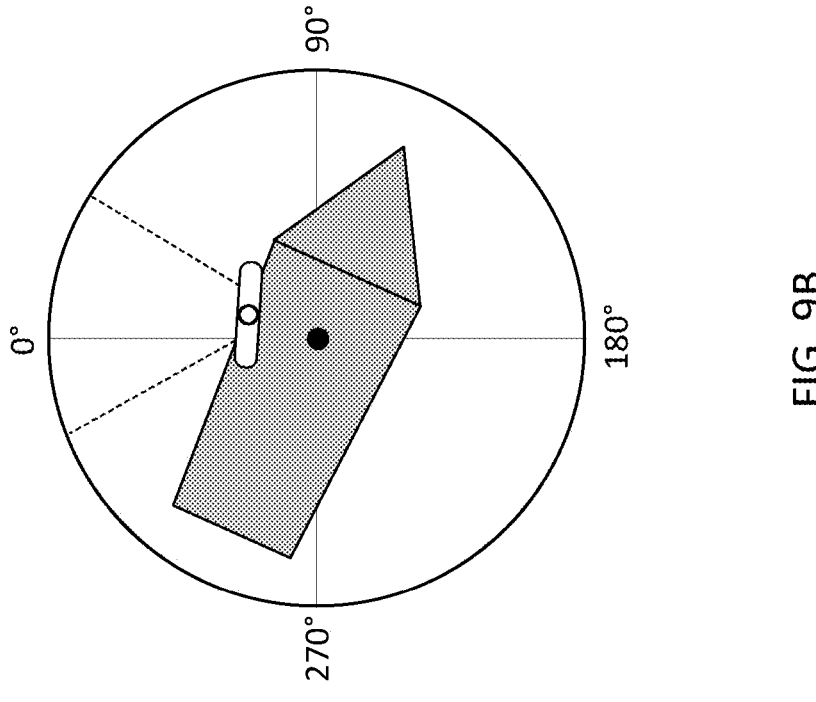
Figure 9A:
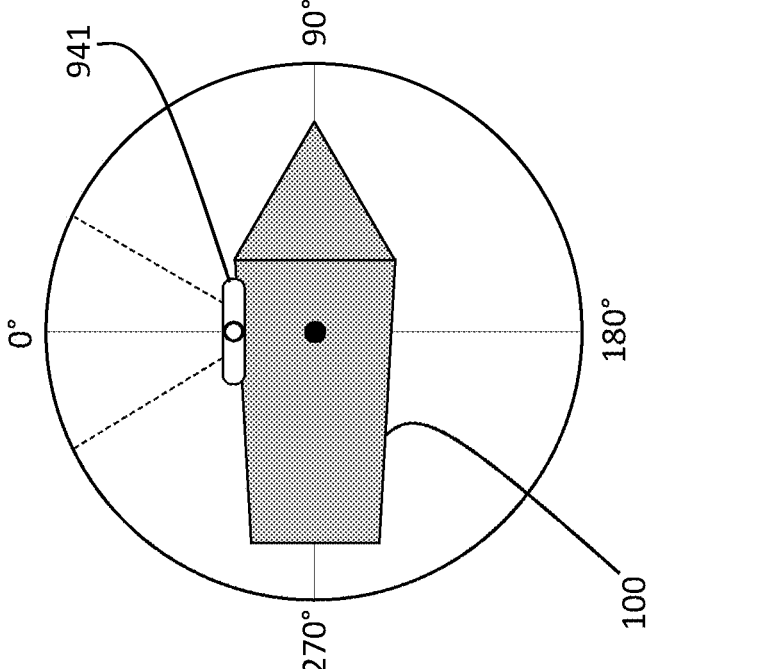
Figure 10B:
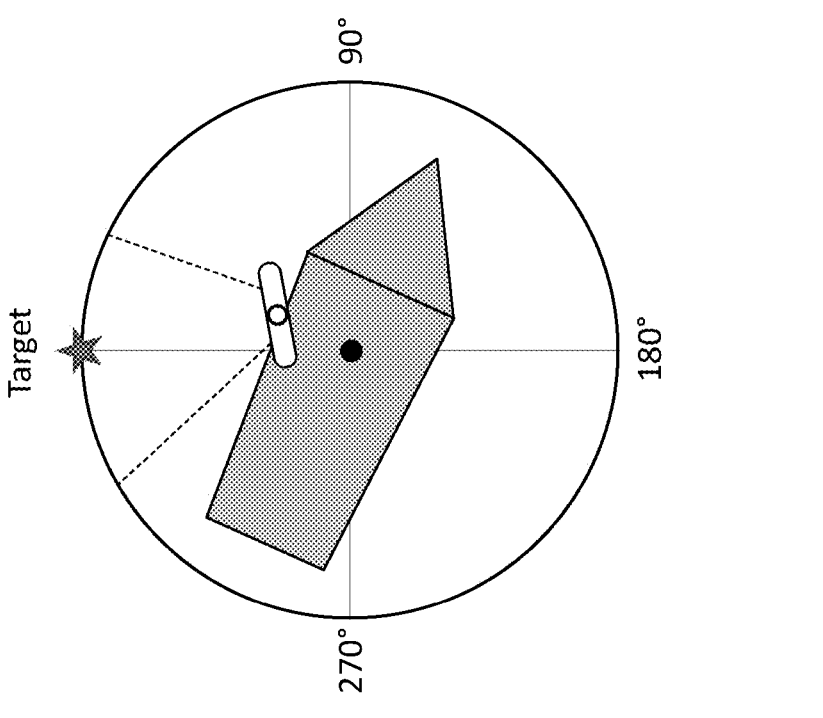
Figure 10A:
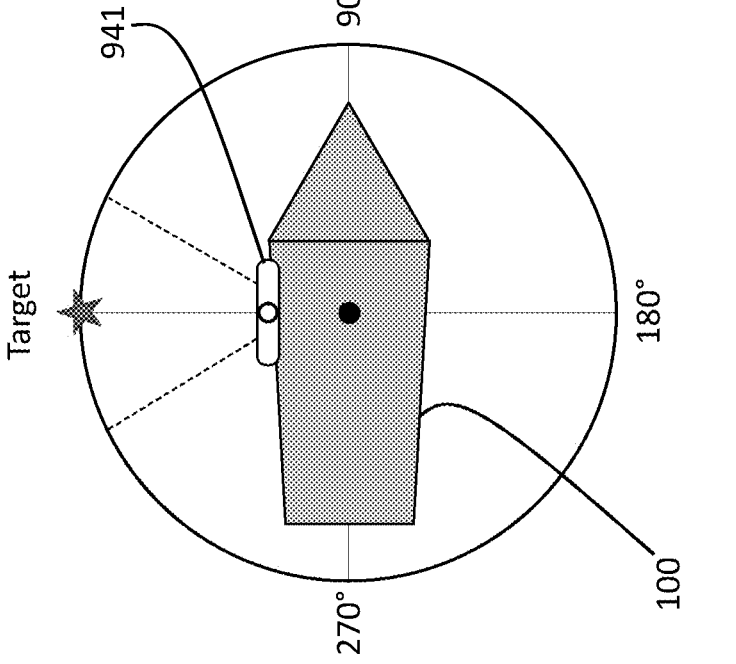
Figure 10D:
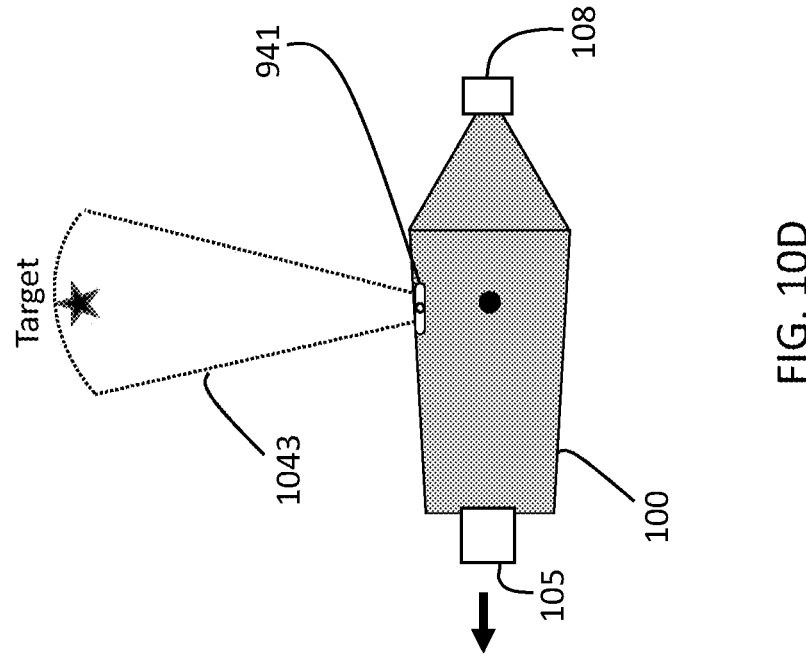
Figure 10C:
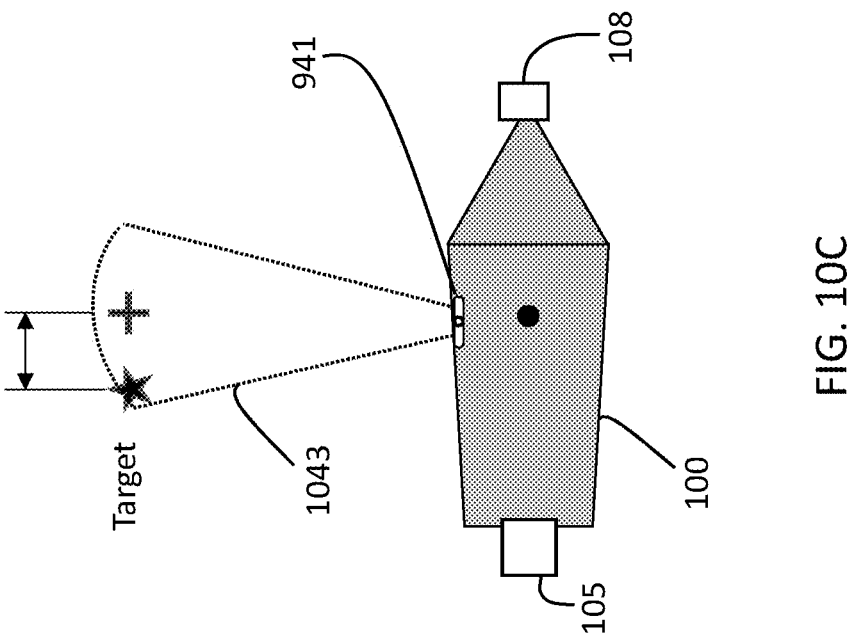
Figure 11:
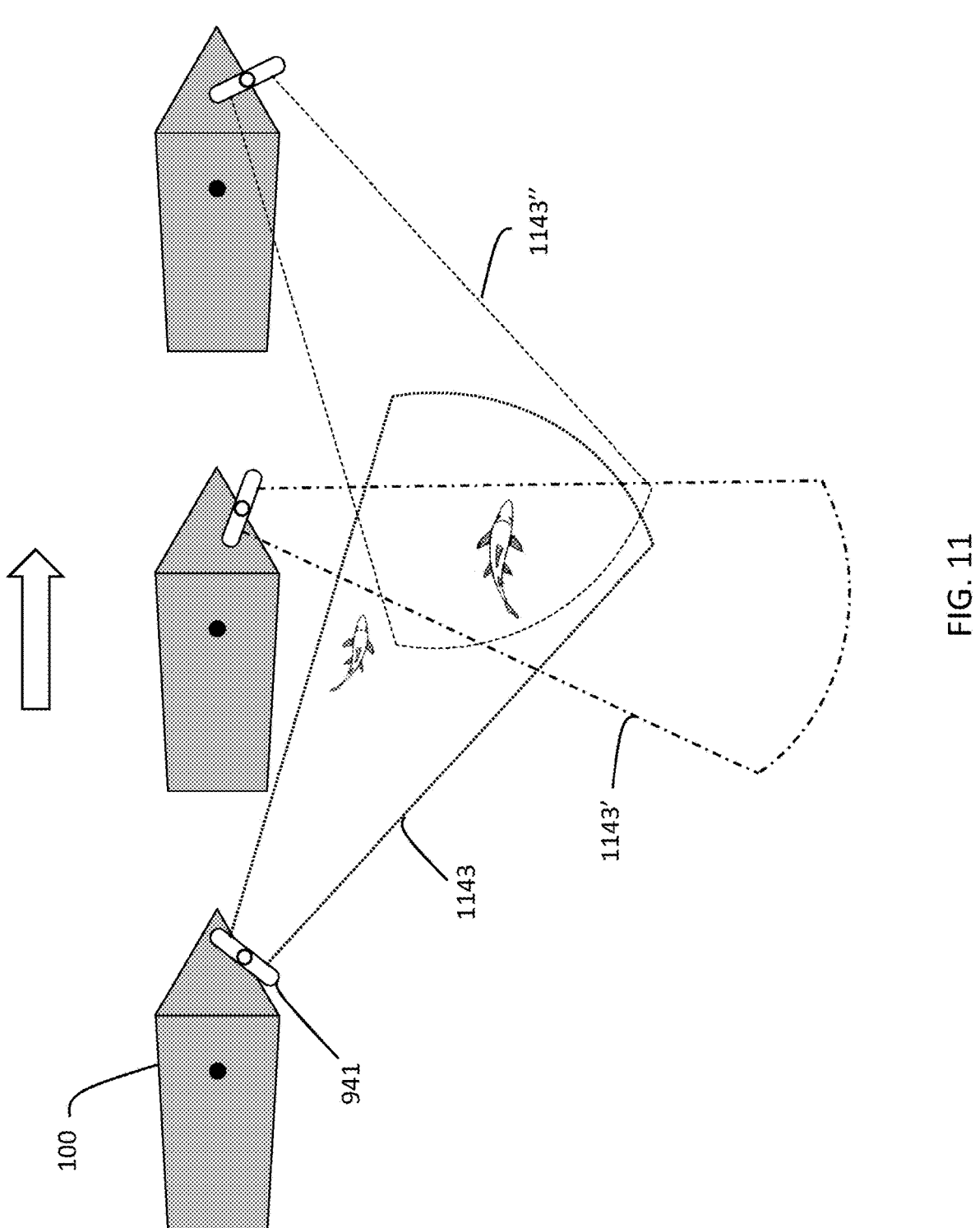
Figure 12:
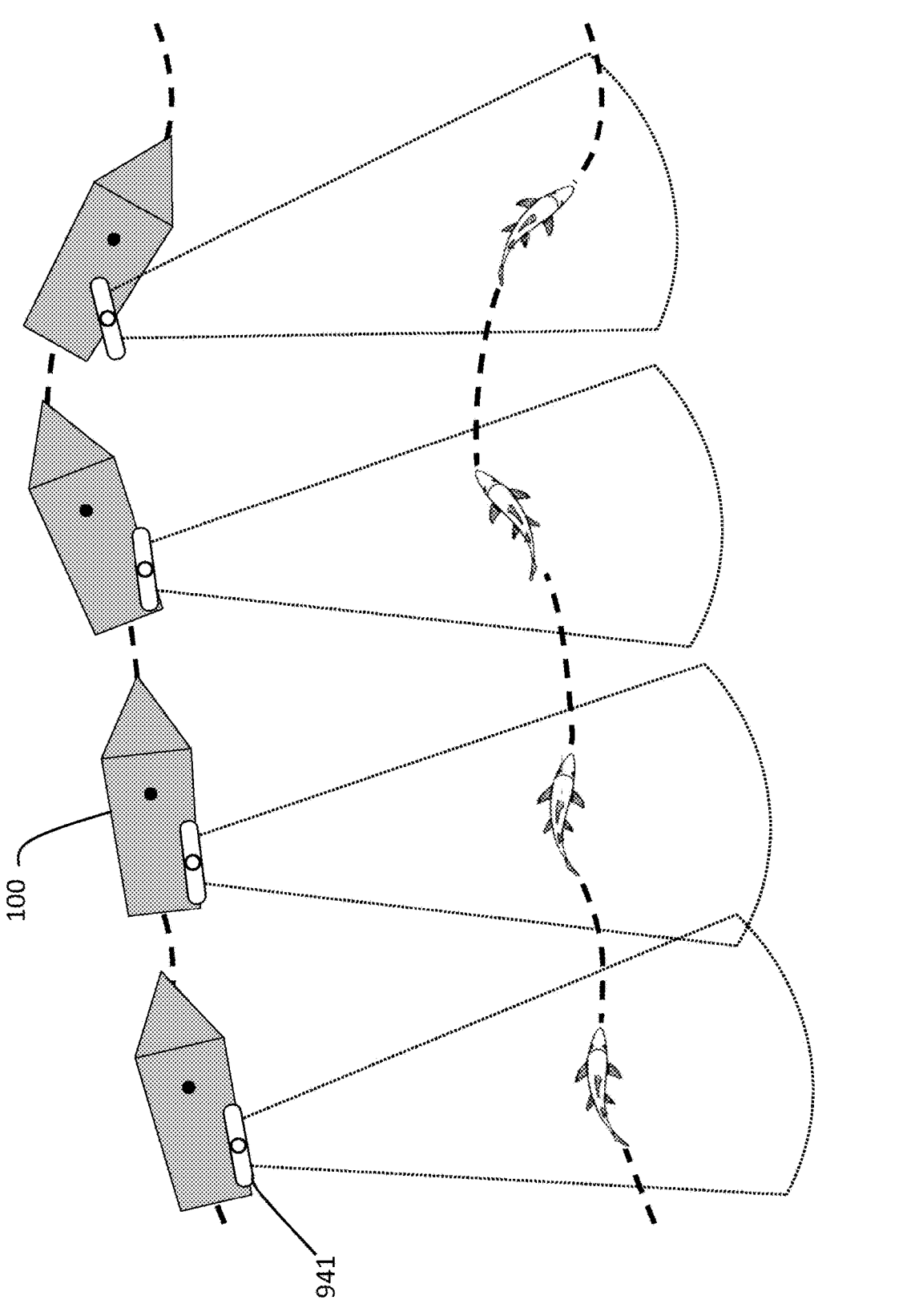
Figure 13A:
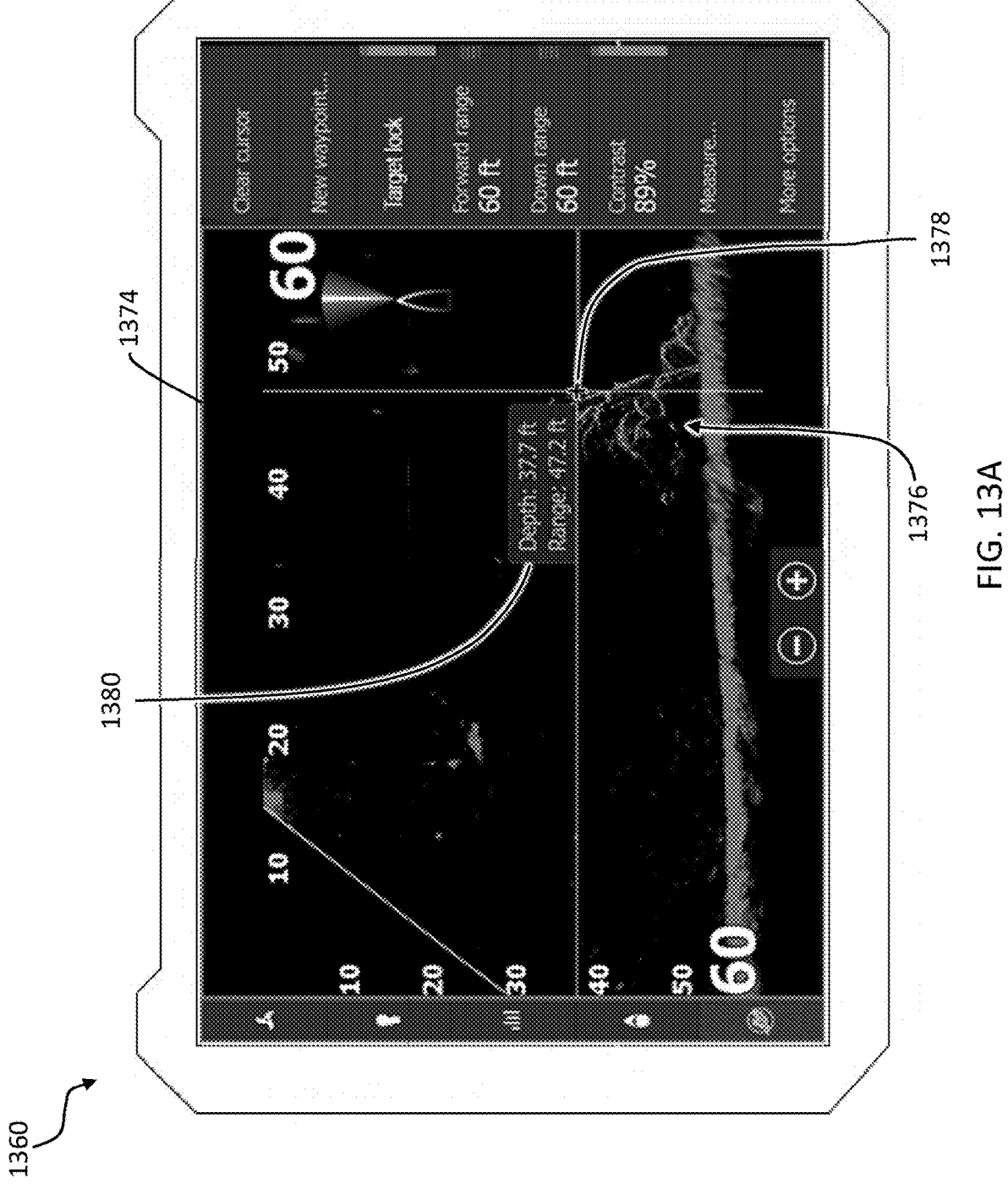
Figure 13B:
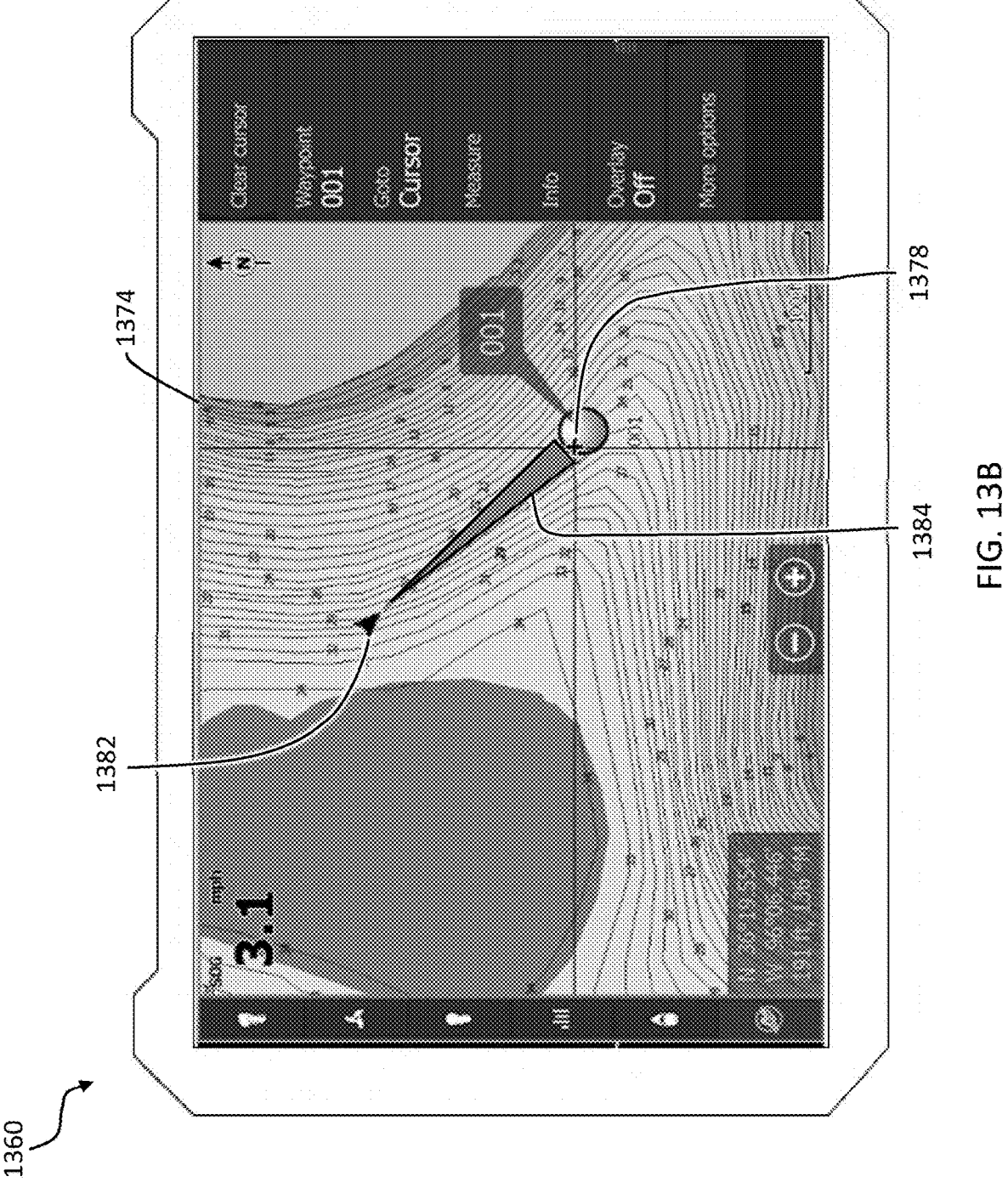
Figure 14:
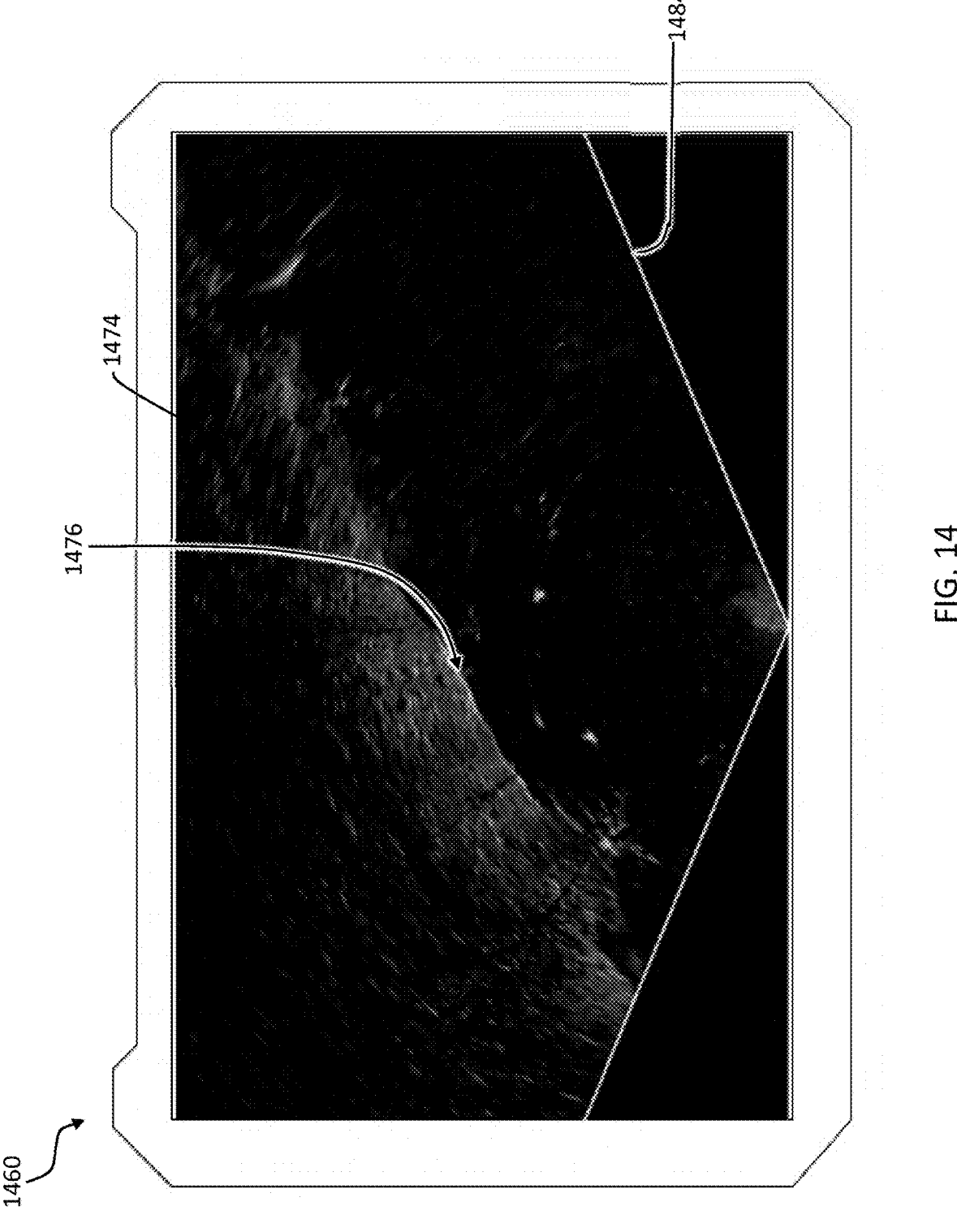
Figure 15:
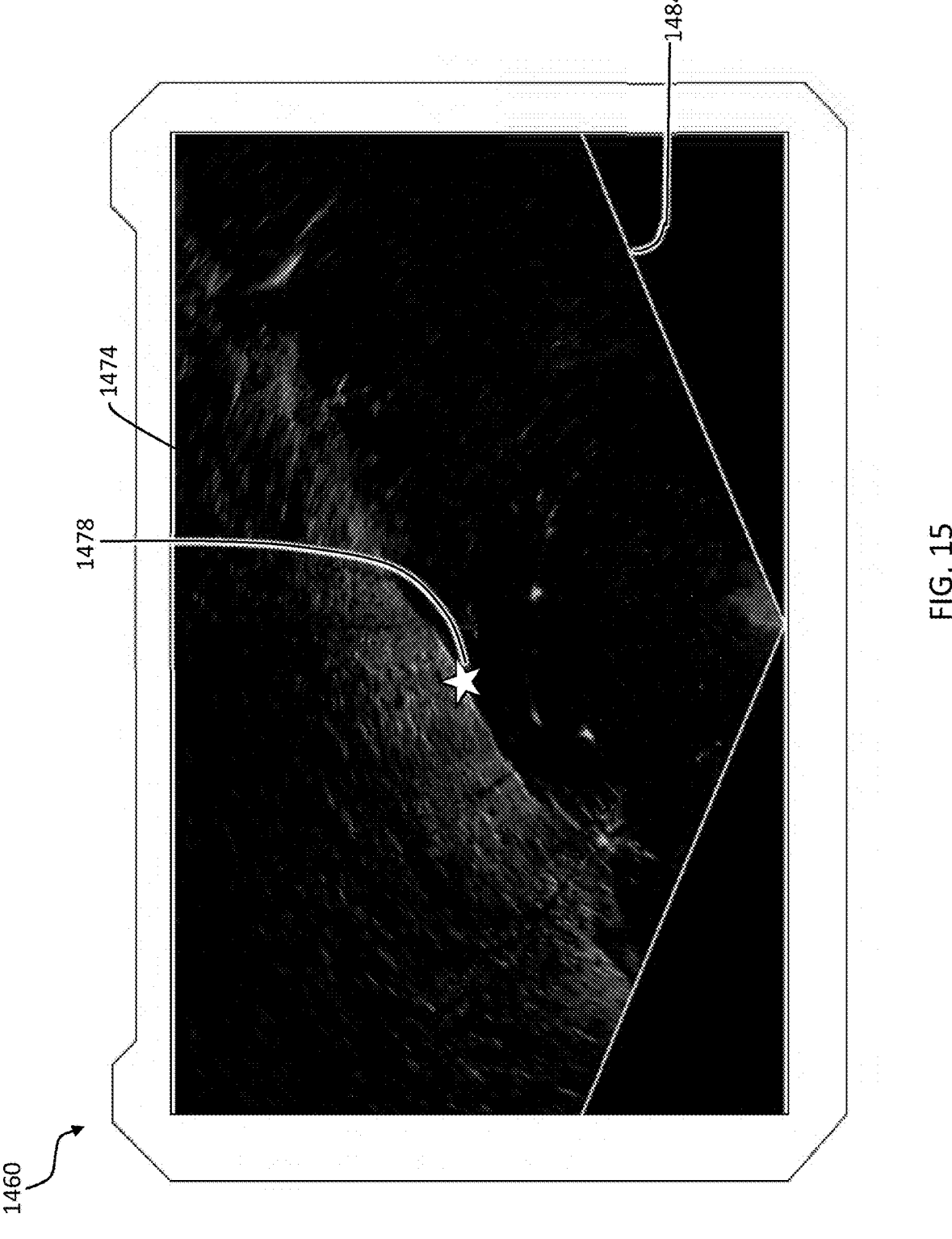
Figure 16:
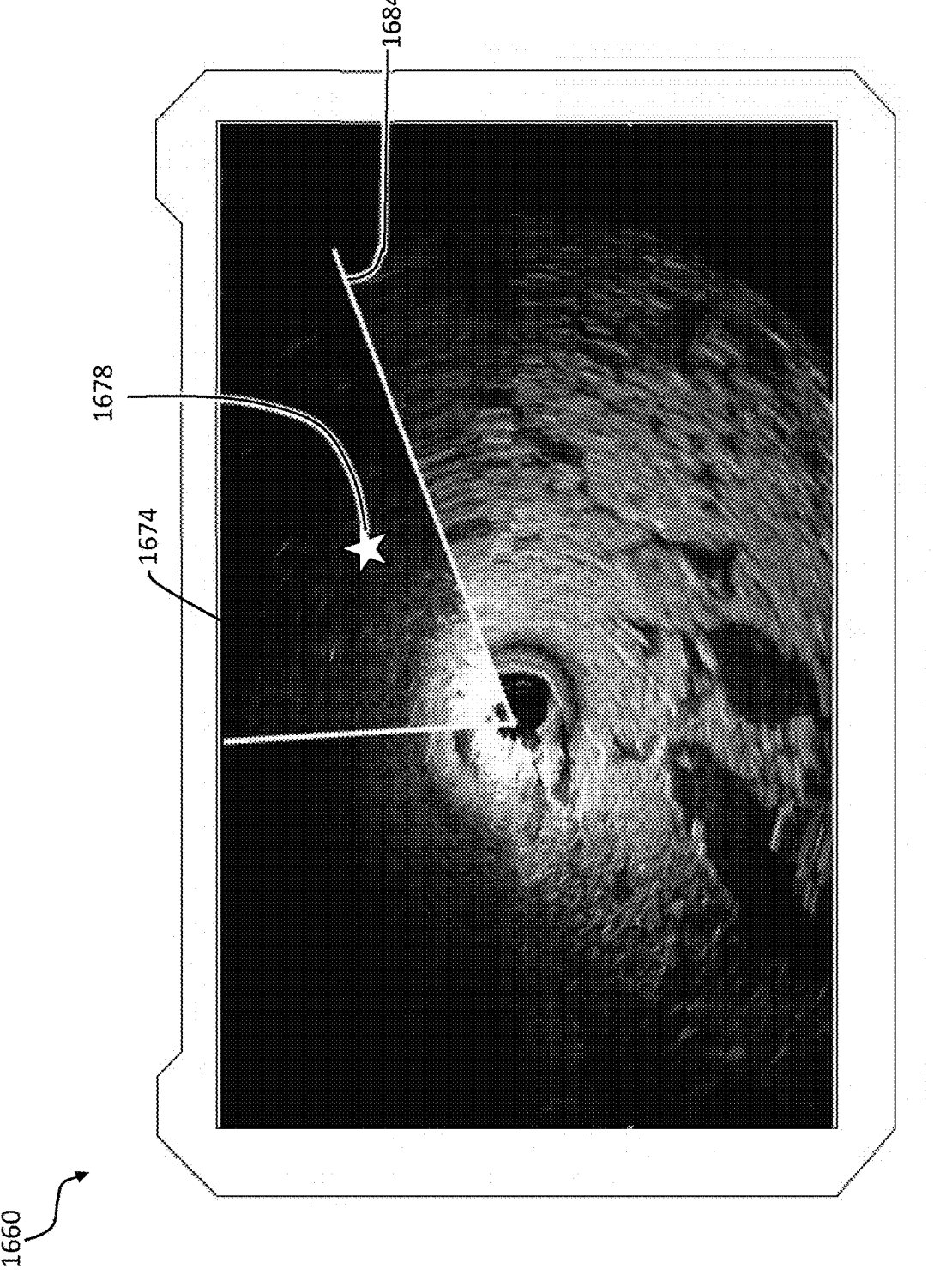
Figure 17:
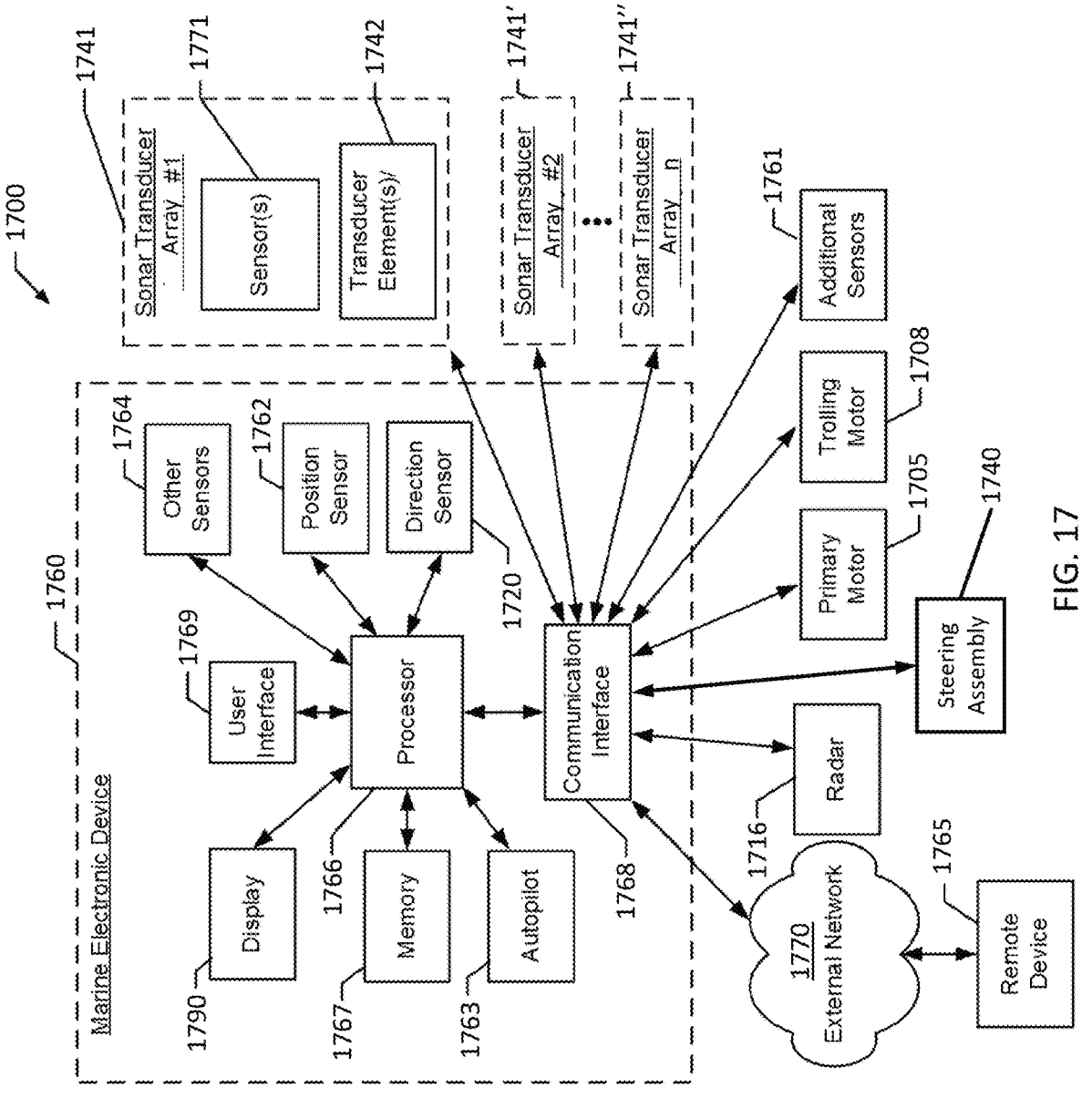
Figure 20:
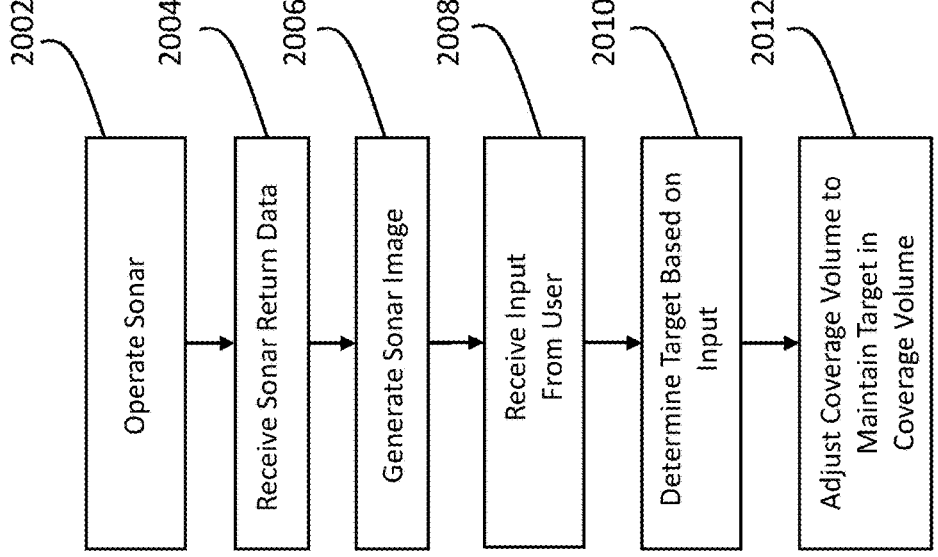
Figure 22:
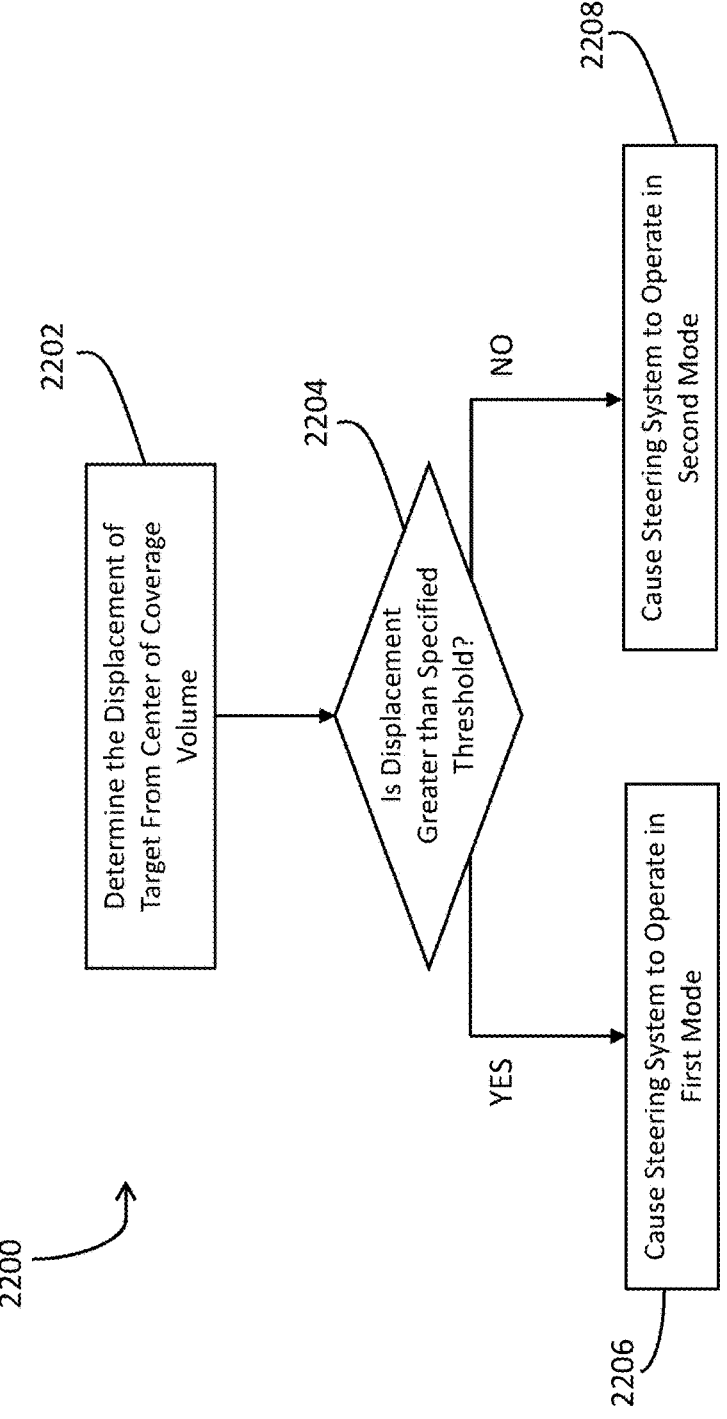

Having thus described the invention in general terms, reference will now be made to the accompanying drawings, which are not necessarily drawn to scale, and wherein:

FIG. 1 illustrates an example watercraft including various marine devices, in accordance with some embodiments discussed herein;

FIG. 2A illustrates an example array of sonar transducer elements, in accordance with some embodiments discussed herein;

FIG. 2B illustrates a side view of the array of sonar transducer elements shown in FIG. 2A, wherein an example first range of angles and an example second range of angles for beamformed sonar return beams are illustrated, in accordance with some embodiments discussed herein;

FIG. 2C illustrates an end view of the array of sonar transducer elements shown in FIG. 2B along with illustrated ranges of angles of beamformed sonar return beams, in accordance with some embodiments discussed herein;

FIG. 2D illustrates an end view of the array of sonar transducer elements shown in FIG. 2B where an actuator is provided that causes the sonar transducer elements to twitch, in accordance with some embodiments discussed herein;

FIG. 3 illustrates three example arrays arranged to provide continuous sonar coverage utilizing beamformed sonar return beams, in accordance with some embodiments discussed herein;

FIG. 4 illustrates a schematic top plan view of a watercraft with an example transducer assembly utilizing three arrays, wherein the transducer assembly is mounted generally horizontally to provide sonar coverage in the port-to-starboard direction in front of the watercraft, in accordance with some embodiments discussed herein;

FIG. 5 illustrates an example sonar system, in accordance with some embodiments discussed herein;

FIGS. 6A-D is a schematic depiction of adjusting the coverage volume of a sonar system, in accordance with some embodiments discussed herein;

FIGS. 7A-B is a schematic depiction of adjusting the coverage volume of a sonar system, in accordance with some embodiments discussed herein;

FIGS. 8A-B is a schematic depiction of adjusting the coverage volume of a sonar system, in accordance with some embodiments discussed herein;

FIGS. 9A-B is a schematic depiction of utilizing a sonar system to maintain a target within the coverage volume in accordance with some embodiments discussed herein;

FIGS. 10A-B is a schematic depiction of utilizing a sonar system to maintain a target within the coverage volume in accordance with some embodiments discussed herein;

FIGS. 10C-D is a schematic depiction of utilizing a sonar system to maintain a target within the coverage volume in accordance with some embodiments discussed herein;

FIG. 11 is a schematic depiction of utilizing a sonar system to maintain a target within the coverage volume in accordance with some embodiments discussed herein;

FIG. 12 is a schematic depiction of utilizing a sonar system to maintain a target within the coverage volume in accordance with some embodiments discussed herein;

FIG. 13A is a schematic depiction of an example display presenting a live sonar image that may be used to enable the selection of a representation of a target in accordance with some embodiments discussed herein;

FIG. 13B is a schematic depiction of an example display presenting a chart that may be used to enable the selection of a representation of a target in accordance with some embodiments discussed herein;

FIGS. 14-15 are schematic depictions of example displays presenting forward-scan sonar images that may be used to enable the selection of a representation of a target in accordance with some embodiments discussed herein;

FIG. 16 is a schematic depiction of an example display presenting a 360 degree image that may be used to enable the selection of a representation of a target in accordance with some embodiments discussed herein;

FIG. 17 is a block diagram of an example system with various electronic devices, marine devices, and secondary devices shown, in accordance with some embodiments discussed herein;

FIG. 18 illustrates a flowchart of an example method for operating a sonar system, in accordance with some embodiments discussed herein;

FIG. 19 illustrates a flowchart of an example method for operating a sonar system, in accordance with some embodiments discussed herein;

FIG. 20 illustrates a flowchart of an example method for operating a sonar system, in accordance with some embodiments discussed herein;

FIG. 21 illustrates a flowchart of an example method for operating a sonar system, in accordance with some embodiments discussed herein; and FIG. 22 illustrates a flowchart of an example method for operating a sonar system, in accordance with some embodiments discussed herein.

DETAILED DESCRIPTION

Example embodiments of the present invention now will be described more fully hereinafter with reference to the accompanying drawings, in which some, but not all embodiments of the invention are shown. Indeed, the invention may be embodied in many different forms and should not be construed as limited to the example embodiments set forth herein; rather, these embodiments are provided so that this disclosure will satisfy applicable legal requirements. Like reference numerals refer to like elements throughout.

FIG. 1 illustrates an example watercraft 100 including various marine devices, in accordance with some embodiments discussed herein. As depicted in FIG. 1, the watercraft 100 (e.g., a vessel) is configured to traverse a marine environment, e.g. body of water 101, under the propulsion of one or more motor assemblies. The watercraft 100 may be a surface watercraft, a submersible watercraft, or any other implementation known to those skilled in the art. Depending on the configuration, the watercraft 100 may include a primary motor assembly 105, which may include a main propulsion motor such as an outboard or inboard motor.

Additionally or alternatively, the watercraft 100 may include a trolling motor assembly 108 configured to propel the watercraft 100 in a direction of travel. This may be done to maintain the watercraft 100 at a position within the body of water 101. As will be appreciated by a person skilled in the art, each of the primary motor assembly 105 and trolling motor assembly 108 is configured to provide a directional thrust to the watercraft 100 by rotating at least a portion of the motor assemblies as a propeller spins (although other propulsion types are contemplated, such as jet propulsion). As depicted, the trolling motor assembly 108 may comprise a propeller 108a coupled to a main housing 108c via a shaft 108b. The direction of thrust of the propeller 108a may be controlled manually via user actuation of a handle extending from the main housing 108c to rotate the shaft 108b (and thus the propeller 108a) and/or electronically, for example, by a trolling motor steering assembly for rotating the shaft 108b. Likewise, the depicted outboard primary motor assembly 105 may rotate to change the direction of thrust as is known in the art (e.g. through the use of an actuator or a similar component), while a rudder 110 may be rotated, such as to steer the watercraft 100. Further, electronically-controlled motor assemblies can, in connection with a location sensor such as a global position system (GPS) sensor, allow for autonomous operation or semi-autonomous operation of the motor assemblies (e.g., to automatically follow a predefined route as in auto-pilot) and/or utilize a "virtual anchor" that automatically adjusts the direction and force of the motor assemblies to maintain the watercraft 100 in a substantially fixed position.

As depicted in FIG. 1, the watercraft 100 includes an example sonar assembly 140 in accordance with various aspects of the present teachings generally comprising one or more sonar transducer elements 142 (e.g., a single transducer element, an array of transducer elements, etc.). The sonar assembly 140 may be coupled to a main housing 144 via a shaft 149. Though various embodiments described herein use the term sonar transducer "array," such a term is for explanatory purposes and it is readily understood that any sonar transducer arrangements may be substituted and/ or added. In this regard, one or more sonar transducer elements (e.g., a conical transducer, a linear transducer, a rectangular transducer, etc.) and/or various types of sonar transducer arrays (e.g., beamforming, interferometry, etc.) may be utilized.

The sonar assembly 140 may be mounted in various positions and to various portions of the watercraft 100 and/or equipment associated with the watercraft 100. For example, the sonar assembly 140 may be removably mounted on the side of the watercraft 100, such as depicted in FIG. 1, or other suitable locations via a detachable coupling (e.g., via a mounting bracket, clip, etc.) for attaching the main housing 144 to a portion of the watercraft 100 (e.g., the transom). Alternatively, the sonar assembly 140 may be permanently coupled to the watercraft 100 (e.g., extending through the hull into the underwater environment, mounted to the transom, etc.). As further examples, a sonar assembly 140a may be positioned on the primary motor assembly 105, a further sonar assembly 140b may be positioned on the trolling motor assembly 108, and another sonar assembly 140c may be positioned directly on the hull 104 of the watercraft 100. The sonar assembly 140a may be provided within a steering assembly 145a, and the primary motor assembly 105 may also be a component of the steering assembly 145a (e.g., in some embodiments, there may not be a dedicated sonar steering assembly and the steering assembly for the primary motor may be utilized to control orientation of the sonar assembly and the primary motor). The sonar assembly 140b may be provided within a steering assembly 145b, and the trolling motor assembly 108 may also be a component of the steering assembly 145b (e.g., in some embodiments, there may not be a dedicated sonar steering assembly and the steering assembly for the trolling motor may be utilized to control orientation of the sonar assembly and the trolling motor). Additionally, the sonar assembly 140c may be provided within a steering assembly 145c. While sonar assemblies are shown in various positions in FIG. 1, in some cases, only one sonar assembly may be provided in some embodiments. Sonar assemblies 140a, 140b, 140c may generally have similar components and may operate similar to the sonar assembly 140.

In use, the sonar assembly 140 may be coupled to the watercraft 100 such that the one or more sonar transducer elements 142 may be disposed within the body of water 101. Generally, the sonar transducer element(s) 142 are configured to transmit at least one sonar beam 143 into the body of water 101 and receive reflected sonar returns from objects (e.g., fish, structure, bottom surface of the water, etc.) that the sonar beam(s) 143 encounter in the underwater environment (e.g., within a coverage volume). One or more processors associated with sonar assembly 140 may determine from the sonar returns (e.g., based on the known speed of sound) the distance to and/or location of the underwater objects and may present such objects on a display 160 to provide the user a "picture" or image of the underwater environment.

As discussed below, the one or more sonar transducer elements 142 may be configured to emit sonar beams and receive sonar returns to generally provide a coverage volume extending outwardly from an emitting face of the sonar assembly 140. By way of example, each of the one or more sonar transducer elements 142 may receive sonar returns within a cone extending from the emitting face such that sonar beam slices from the one or more sonar transducer elements 142 together extend across an overall sonar beam angle, thereby defining a coverage volume extending radially outward from the emitting face of the one or more sonar transducer elements 142. Embodiments of sonar assemblies 140 in accordance with the present teachings may enable the independent, electronic control of the orientation of the one or more sonar transducer elements 142. This may be beneficial over other systems in which the facing direction of sonar transducer elements 142 depends on the orientation of the watercraft 100 or the orientation of the portion of the watercraft 100 to which the sonar transducer elements 142 are fixed (e.g., the orientation of a sonar transducer elements 142 coupled to the trolling motor assembly 108 changes as the trolling motor assembly 108 rotates to propel the watercraft 100 in a desired direction). As discussed below and schematically depicted in FIG. 1, for example, the sonar assembly 140 includes a steering assembly 145 that may be configured, under the direction of one or more processors, to adjust the coverage volume by rotating the one or more sonar transducer elements 142 (e.g., about the longitudinal axis of the shaft 149), tilting the one or more sonar transducer elements 142 so as to angle the orientation of the one or more sonar transducer elements 142 toward or away from the water surface, and/or adjusting a vertical position (e.g., depth) of the one or more sonar transducer elements 142 below the water surface, such as by increasing or decreasing the length of the shaft 149 within the water.

As noted above, the sonar system may include a display 160 to display to the user various data, such as a sonar image of the underwater environment. Such a sonar image may, for example, be based on the distance to and/or location of underwater objects as determined from the sonar return data. The display 160 may be associated with (e.g., coupled to) the main housing 144, may be disposed at a variety of other locations within the watercraft 100, and/or may be held by the user (e.g., as a wireless display). For example, as depicted in FIG. 1, the sonar display 160 is positioned proximate the helm (e.g., steering wheel) of the watercraft 100—although other places on the watercraft 100 are contemplated. In some example aspects, a user's mobile device may be configured to display the sonar data.

The watercraft 100 may also comprise other components such as may be utilized by a user to interact with, view, or otherwise control various aspects of the various sonar systems described herein or other one or more marine control devices. For example, the watercraft 100 of FIG. 1 comprises a radar 116, which is mounted at an elevated position (although other positions relative to the watercraft 100 are also contemplated). The watercraft 100 also comprises an AIS transceiver 118, a direction sensor 120, and a camera 122, and these components are each positioned at or near the helm (although other positions relative to the watercraft 100 are also contemplated). Other example devices on the watercraft 100 include a temperature sensor that may be positioned so that it will rest within or outside of the body of water 101, a wind sensor, one or more speakers, and various vessel devices/features (e.g., doors, bilge pump, fuel tank, etc.), among other things. Additionally, one or more sensors may be associated with marine devices; for example, a sensor may be provided to detect the position of the primary motor assembly 105, the trolling motor assembly 108, or the rudder 110. It will be appreciated that control and/or display of these components may be integrated into the display 160 or may be controlled via one or more other electronic devices.

Each of the one or more sonar transducer elements 142 in the sonar assemblies 140, 140a, 140b, 140c can be any known in the art or hereafter developed and modified in accordance with the present teachings. Such examples include transducers suitable for use in downscan or sidescan sonar imaging and phased arrays to generate "live" displays, though other transducer assembly configurations can also be used to form sonar imagery. That is, embodiments of the present invention generally provide a sonar coverage volume extending outwardly from one or more directions of a sonar assembly but are not necessarily meant to be limited to a specific transducer assembly.

In some example embodiments, systems and methods in accordance with the present teachings utilize sonar transducer assemblies that provide for generating near real-time (e.g., "live") sonar imagery. In this regard, in some embodiments, the entire sonar image may be continuously updated all at once (e.g., as opposed to building up historical slices of sonar data as is typical of conventional sonar images). Examples of such sonar transducer elements to form live sonar imagery are depicted in FIGS. 2A-C. Furthermore, examples of live sonar images are illustrated in FIGS. 13A and 14-15.

In some embodiments, the sonar system may include a sonar assembly configured to attach to a watercraft, and the watercraft may not have a motor assembly. For example, the sonar system may be formed by placing the sonar assembly on a kayak, a jon boat, a sail boat, or another watercraft not having any motor assembly. Additionally, where a GPS is provided on the watercraft, the GPS may be used to identify one or more of the following: the current location of the watercraft, the current direction of the watercraft, one or more past locations of the watercraft, one or more past directions of the watercraft, etc. The GPS may be provided in a multifunction display (MFD), in a motor assembly, in the sonar assembly, or at another location on the watercraft.

FIGS. 2A-2C illustrate a plurality of sonar transducer elements 242 forming an example transducer array 241 that may be utilized with various embodiments of the present invention. In some embodiments, the transducer array 241 may include a plurality of sonar transducer elements 242 arranged in a line and electrically connected relative to each other. For example, the sonar transducer elements 242 may be individually positioned on a printed circuit board (PCB). The PCB may mechanically support and electrically connect the electronic components, including the sonar transducer elements using conductive tracks (e.g. traces), pads, and other features. The conductive tracks may comprise sets of traces; for example, each sonar transducer element may be mounted to the PCB such that the sonar transducer element is in electrical communication with a set of traces. Each sonar transducer element, sub-array, and/or the array of sonar transducer elements may be configured to transmit one or more sonar pulses and/or receive one or more sonar return signals. Although FIGS. 2A-C illustrate a linear array with sonar transducer elements of a certain shape, different types of arrays (or sub-arrays), sonar transducer elements, spacing, shapes, etc. may be utilized with various embodiments of the present invention. For example, more or less arrays or elements within the arrays may be used, different sonar transducer element configurations may be used, multiple sonar transducer assemblies can be used, etc.

In the illustrated embodiment shown in FIG. 2A, the transducer array 241 includes an emitting face 245 with a length $L_A$ and a width $W_A$, where the length is greater than the width. Within the transducer array 241, each sonar transducer element 242 defines an emitting face 242b with a length $L_T$ and a width $W_T$, where the length is greater than the width. The length of each sonar transducer element 242 is perpendicular to the length of the emitting face 245. Each sonar transducer element 242 is spaced at a predetermined distance from an adjacent sonar transducer element 242, which may be designed based on desired operating characteristics of the transducer array 241, such as described herein.

In some embodiments, the transducer array 241 of sonar transducer elements 242 is configured to operate to transmit one or more sonar beams into the underwater environment. Depending on the configuration and desired operation, different transmission types of sonar beams can occur. For example, in some embodiments, the transducer array 241 may transmit sonar beams according to a frequency sweep (e.g., chirp sonar) so as to provide sonar beams into the underwater environment. In some embodiments, the transducer array 241 may be operated to frequency steer transmitted sonar beams into various volumes of the underwater environment. In some embodiments, the transducer array 241 may be operated to cause a broadband transmit sonar beam to be sent into the underwater environment. Depending on the frequency used and phase shift applied between sonar transducer elements 242, different volumes of the underwater environment may be targeted.

In some embodiments, the transducer array 241 may be configured to receive sonar return signals. The way the sonar return signals are received and/or processed may vary depending on the desired sonar system configuration. FIGS. 2B-2C illustrate the transducer array 241 with example possible sonar return beam coverage according to various example embodiments. In this regard, in some embodiments, each of the plurality of sonar transducer elements are configured to operate at a fixed phase shift (e.g., at one of 0°, $\pi/2$ radian, $\pi/4$ radian, or $\pi/8$ radian) and vary in frequency (e.g., between 500 kHz-1200 kHz). This processing approach beamforms multiple sonar return beams (e.g., beam 243) between a first range of angles ($\theta_1$) 246 and between a second range of angles ($\theta_2$) 247. To explain, the sonar returns may be received by the transducer array 241 and filtered into frequency bins based on the frequency of the signal. From that, sonar return beams 243 can be determined that provide sonar returns within a small angle window (e.g., 0.5° to 3°, although greater or lesser angle windows are contemplated). Since the orientation with respect to the watercraft 100 can be known, and the frequency is known, then the relative angle with respect to the waterline (or other reference) can be determined and used to form sonar imagery, as described for example in U.S. Non-Provisional application Ser. No. 16/944,186, entitled "Beamforming Sonar System with Improved Sonar Image Functionality, and Associated Methods," filed Jul. 31, 2020, and later published as U.S. Pat. Publ. No. 2022/0035026, the teachings of which are hereby incorporated by reference in its entirety.

With further reference to FIG. 2B, the sonar return beams (e.g., 243) can be "steered" (e.g., along arrow R) within the first range of angles 246 based on varying the frequency (e.g., between 246a and 246b). Likewise, the sonar return beams can be "steered" within the second range of angles 247 based on varying the frequency (e.g., between 247a and 247b). By operating the sonar transducer elements at a fixed phase shift, two range of angles 246, 247 can be covered with sonar beams, but there is also a gap (e.g., indicated by the range of angles β) that may not be able to be covered by the frequency steered sonar return beams.

Without being bound by theory, a perhaps simplified explanation of this can be based on considering a single beam shape that is formed by a receipt event of the array. The beam shape is formed of a rather wide main beam lobe, along with at least one relatively small defined side lobe (e.g., the sonar beam 243) that extends outwardly therefrom. By operating at a fixed phase shift and ignoring the main beam lobe, the sonar return signals received within the side lobe can be determined. Further, changing the frequency causes a shifting of the direction of the side lobe among the range of angles (246 or 247). Since the side lobe is symmetrical about the main lobe, there are two ranges of angles that are symmetrical about the facing direction $D_{FD}$ of the emitting face 245 of the transducer array 241.

Further information regarding beamforming, including frequency steered beamforming, can be found, for example, in the following: U.S. Pat. No. RE45,379, entitled "Frequency Division Beamforming for Sonar Arrays"; U.S. Pat. No. 10,114,119, entitled "Sonar Systems and Methods Using Interferometry and/or Beamforming for 3D Imaging"; U.S. Pat. No. 9,739,884, entitled "Systems and Associated Methods for Producing a 3D Sonar Image"; and U.S. patent application Ser. No. 16/382,639, published as U.S. Publication No. 2019/0265354, and entitled "Sonar Transducer Having Geometric Elements"; the contents of each hereby being incorporated by reference in their entireties.

Depending on various factors, different beam shapes can be achieved and different ranges of angles can be achieved. The following describes some example factors that can be varied to effect the beam shapes and different ranges of angles: the number of sonar transducer elements, the size/ shape of the sonar transducer elements, the size/shape of the array, the fixed phase shift, the frequency range, among other things. An example embodiment produces a first range of angles spanning ~22.5° and a second range of angles spanning ~22.5° with a gap of range of angles of ~45° therebetween. Additionally, sonar return beams of ~0.5° to 1° are formed. Further, with reference to FIG. 2C, a transverse beamwidth $\theta_3$ of ~20° is formed (although other transverse beamwidths are contemplated such as between ~9° and 27°). Some example embodiments that may achieve such example beam shapes include an array length of between ~100-150 mm; an array width of between ~3-10 mm; an array thickness of between ~1-3 mm; a number of sonar transducer elements of between 50-200; a width of the sonar transducer element of between ~0.4-1 mm; and a length of the sonar transducer element of between ~2-10 mm (although outside of these ranges is also contemplated).

In some embodiments, the effective coverage volume for an array of one or more sonar transducer elements may be increased by twitching the array about its axis. In some embodiments, the coverage volume may be increased by increasing the beamwidth. FIG. 2D illustrates an end view of the transducer array 241 of sonar transducer elements shown in FIG. 2B where the transducer array 241 is configured to rotate about an axis 299. Rotation of the transducer array 241 may alter the orientation of the coverage volume generated by sonar transducer elements 242 in the transducer array 241. In some embodiments, the steering assembly (e.g., the primary motor, the trolling motor, a separate steering assembly, etc.) may be used to cause the twitching to occur. In some embodiments, a separate twitching mechanism (even beyond the steering assembly) may be provided. Accordingly, the following description uses the term "actuator" to describe a mechanism (which could be any of the prior described) that is configured to perform the twitching. Unless otherwise specifically stated, the actuator may refer to a steering assembly (such as any steering assembly described herein) or a separate twitching mechanism.

Returning to FIG. 2D, an actuator 275 is provided that causes the transducer array 241 to twitch back and forth (about the axis 299) as indicated by the arrows below the actuator 275. As shown, the transducer array 241 may have a transverse beamwidth $\theta_4$ and initial coverage volume 246 without any twitching. When the actuator 275 is used to cause the transducer array 241 to twitch, the effective coverage volume 246a may be expanded. For example, the actuator 275 when twitching may have an increased transverse beamwidth $\theta_5$. While the actuator 275 in FIG. 2D is configured to cause the transverse beamwidth of a transducer array 241 to be increased, the actuator 275 may be configured to cause the coverage volume to be increased in other directions (e.g., in the forward direction) such as by twitching about different axes (either alternatively or additionally). In some embodiments, the actuator 275 may always be active to generate the twitching movement. However, in other embodiments, the actuator 275 may be activated only in limited instances. For example, the actuator 275 may be activated upon the receipt of user input in some embodiments. User input may, for example, be provided in response to a request from the user to increase the coverage volume or in response to a request to find a target. As another example, the actuator 275 may be activated based on other criteria. For example, the actuator 275 may be activated automatically if the watercraft has just entered into a new area for which data is not available in memory. As another example, the actuator 275 may be activated automatically or by user input upon identifying an item of interest such as a shipwreck or upon identifying an area where fish tend to populate. As a further example, the actuator 275 may be activated automatically or by user input when no target has been identified in an initial coverage volume, and the actuator 275 may be deactivated after a target has been identified in the expanded coverage volume as long as the target remains in the coverage volume—the coverage volume may be adjusted to position the target near the center of the coverage volume once the target has been identified, making it unnecessary to maintain the expanded coverage volume. Additionally, where a target was previously identified and can no longer be found in the initial coverage volume, the actuator 275 may be activated automatically to expand the coverage volume in attempt to locate the target. Alternatively, where a target is identified in an initial coverage volume for the first time, the actuator 275 may be activated to generate an expanded coverage volume at least temporarily to see if other similar targets can be found in the expanded coverage volume, and this may be beneficial to identify a desirable fish within a school of fish. Alternatively, the actuator 275 may be periodically activated in regular intervals (e.g. once every 60 seconds, once every five minutes, etc.). Twitching may increase the coverage volume at least temporarily and increase the chances of identifying moving or stationary targets. Twitching may also provide additional data and/or different types of data to further increase the reliability of any generated sonar images.

In some embodiments, the system may be configured to utilize more than one transducer array, where the transducer arrays are oriented relative to each other to increase the coverage volume of the underwater environment. For example, in some embodiments, a second (or more) transducer array(s) can be added and tilted relative to the first transducer array such that the gap within the first transducer array is "covered" by one or more of the range of angles of sonar return beams from such transducer array(s). FIG. 3 illustrates an example three array sonar assembly 341 that is designed to provide continuous sonar coverage utilizing beamformed sonar return beams. The sonar assembly 341 includes a first transducer array 341', a second transducer array 341", and a third transducer array 341'"—arranged in an "X" plus "_" configuration having a theoretical center point 341a (the first transducer array 341' and the third transducer array 341'" form the "X" while the second transducer array 341" is positioned in an offset manner from the center point of the "X"—forming the "_" of the configuration). The first transducer array 341' is oriented with a facing direction (e.g., substantially straight down relative to the figure) so as to produce a first range of angles 346' and a second range of angles 347' (with a gap in between as discussed above with reference to FIG. 2B). The second transducer array 341" is oriented with a facing direction at an angle (e.g., −22.5° relative to the facing direction of the first transducer array 341') so as to produce a first range of angles 346" and a second range of angles 347" (with a gap in between). The third array 341'" is oriented with a facing direction at another angle (e.g., −45° relative to the facing direction of the first array 341') so as to produce a first range of angles 346'" and a second range of angles 347'" (with a gap in between). As so arranged, the gaps between each set of the two range of angles are covered by a range of angles from each of the other two transducer arrays. The illustrated example thus provides continuous sonar beam coverage for ~135°, although other overall coverage angles are contemplated such as angles ranging from 90°-140°.

FIG. 4 illustrates a watercraft 100 with an example transducer array 441 oriented such that its three arrays provide a sonar beam 443 with continuous coverage hori-zontally in the forward direction relative to the watercraft 100 (e.g., port-to-starboard). In this regard, the three arrays work together to provide corresponding ranges of angles 446', 447', 446", 447", 446'", 447'"—similar to those illustrated and described with respect to FIG. 3. In the illustrated embodiments, the lengths of each of the emitting faces of the three transducer arrays extend in the port-to-starboard direction of the watercraft 100. As noted above, the frequency of the sonar return beams can be varied to provide a sonar return beam 448 that can sweep (e.g., along arrow A) within the sonar beam 443 (e.g., across the three arrays) —to capture sonar return signals along the sonar beam coverage. With the transducer array 441 as in FIG. 4, the resulting 2D live sonar image would show a live (or near real-time) sonar image corresponding to the coverage volume extending in front of the watercraft according to the sonar beam 443. While FIG. 4 depicts the coverage volume of the sonar beam 443 extending directly out from the bow of the watercraft 100, some sonar systems in accordance with the present teachings are configured to adjust the orientation of the transducer array 441, for example, independent of the orientation of the watercraft 100.

FIG. 5 illustrates an example sonar system 500 for providing a sonar image of an underwater environment based on sonar return data obtained by a transducer array 541 of a sonar assembly 540 and a steering system 570 responsive to steering commands in order to adjust the aim of the transducer array 541. The transducer array 541 may be positioned within a transducer housing 542 and aimed in a facing direction (e.g., arrow $F_F$). The housing 542 may also include an orientation/position sensor 543, such as gyroscope or other orientation sensor (e.g., accelerometer, MEMS, direction, etc.) that can be configured to determine the relative orientation and/or vertical position of the transducer array 541—such as with respect to the watercraft 100 and/or the real world. Such information may be used in conjunction with and/or for, for example, the steering system 570.

As shown, the sonar assembly 540 includes an elongate shaft 549 extending along an axis A1 between a first end 549a and a second end 549b, a main housing 544 that at least partially contains a steering system 570, and the transducer array 541. The transducer array 541 is disposed proximate to the second end 549b of the shaft 549 and is configured to be disposed within an underwater environment when the sonar assembly 540 is attached to a watercraft 100 (see FIG. 1). The transducer housing 542 may be operatively coupled to the shaft 549 and/or the steering system 570 to enable change in the orientation and/or vertical position of the transducer housing 542 and/or transducer array 541. For example, the transducer housing 542 may be rotatably attached to two arms 548a, 548b to enable rotation about a second axis A2 (such as to enable tilting of the transducer array 541) —although other orientation changing means are contemplated. In some embodiments, various mechanisms, e.g., a motor, gears, belt drive, etc., may be employed to enable controlled orientation changing. The elongate shaft 549 may be provided with varying lengths—for example, where the sonar assembly 540 is located on a primary motor assembly (see FIG. 1) or a trolling motor assembly 108 (see FIG. 1), an elongate shaft with a shorter length may be utilized (or the shaft may be a theoretical shaft representing an axis of rotation to which the sonar assembly rotates about while being attached to the primary motor assembly or trolling motor assembly).

In some embodiments, when the sonar assembly 540 is attached to the watercraft 100 and the transducer array 541 is submerged in the water, the main housing 544 may be positioned out of the body of water 101 and visible/accessible by a user. The main housing 544 may be configured to house components of the sonar system 500, such as may be used for processing sonar data and/or controlling operation of the motors 570*a-c*, among other things. For example, depending on the configuration and features of the sonar assembly 540, the main housing 544 may contain, for example, one or more of a processor 580, a memory, a communication interface, a steering system 570 and an autopilot navigation assembly.

As noted above, the facing direction of the transducer array 541 may be adjusted using various mechanisms, e.g., one or more motors, gears, belt drive, etc. By way of example, the steering system may contain a motor (or a plurality of motors) that individually or in combination are controlled to adjust the orientation of the emitting face of the transducer array 541 about one or more axes. As depicted in FIG. 5, the example steering system 570 comprises three motors 570*a*, 570*b*, and 570*c* disposed within the housing 544, though it will be appreciated that fewer or more motors may be utilized in accordance with the present teachings to provide orientation adjustments to the transducer array 541 along three axes as discussed below or in any number of desired directions. Moreover, it will be appreciated that though the motors 570*a*, 570*b*, and 570*c* are disposed within the housing 544, various portions of the steering system 570 may be disposed at various locations to perform the adjustments to the orientation of the transducer array 541 as otherwise discussed herein. In some embodiments, the first motor 570*a* may be coupled to the shaft 549 so as to adjust the length of the shaft 549 disposed within the underwater environment, for example, by changing the length of the shaft 549 (e.g., with an inner portion being extended from or retracted within an outer portion) or by moving the shaft 549 along its axis A1. In some example embodiments, the second motor 570*b* may be coupled to the shaft 549 so as to rotate the shaft 549 about its axis A1. In some example embodiments, the third motor 570*c* may be configured to tilt the emitting direction of the transducer array 541 toward or away from the water surface, for example, by tilting at least a portion of the sonar assembly 540. By way of example, the third motor 570*c* may be coupled to the transducer array 541 (or a housing containing the same), for example, via one or more cables so as to tilt (e.g., pivot) the emitting face of the transducer array 541 toward or away from the water surface (e.g., such as described above). Alternatively, for example, the third motor 570*c* may tilt the shaft 549 itself such that the axis A1 of the shaft 549 would no longer be substantially perpendicular to the water surface as in the depicted orientation of FIG. 5.

As shown, the sonar system 500 also includes a processor 580 for controlling operation of the steering system 570, the display 590, and/or the transducer array 541. Though the processor 580 is depicted as being disposed within the main housing 544 and may be electrically coupled to the steering motors 570*a-c* and the transducer array 541, it will be appreciated that the processor 580 may be disposed in a variety of locations, including remote from the main housing 544 such that commands to the various components may be provided wirelessly. While the processor 580 is illustrated within the main housing 544 of the sonar system 500 in FIG. 5, another processor may be provided at the helm of the watercraft 100 (see FIG. 1) or at another location. One or more processors on the watercraft 100 may work to control the operation of the systems described herein.

With reference again to FIG. 5, the main housing 544 is connected to the shaft 549 proximate the first end 549*a* of the shaft 549 and may, in some embodiments, include an attachment device 571 (e.g., a clamp, a mount, or a plurality of fasteners) to enable connection or attachment of the sonar assembly 540 to the watercraft 100. In some embodiments, the main housing 544 may also include a handle (not shown) that enables mechanical steering of the transducer array 541 by a user (e.g., through angular rotation of the shaft 549 about axis A1) and/or moving the sonar assembly 540 to and from a stowed configuration.

As depicted in FIG. 5, the sonar system 500 may in some embodiments additionally include a display 590 that may be wired or wirelessly connected to the main housing 544 to display sonar data. In some aspects, the display 590 may be a handheld device or may be a display interface executed on a user device (e.g., a tablet computer, smart phone, or the like), a marine electronic device of the watercraft 100, or other remote operating device. In various embodiments, the displayed sonar image may include an indicator for the user of the orientation of the transducer array 541 relative to the display 590. By way of example, an arrow overlaid on the sonar image may indicate to the user the direction of the coverage volume of the transducer array 541 relative to current orientation of the display 590. In some such embodiments, the orientation of a display 590 may be adjusted by the user, for example, such that the display 590 and the transducer array 541 are similarly aligned (e.g., when the arrow points straight up on the display) to help the user determine where to cast, for example.

In some aspects, a human-computer interface may be associated with the display 590 to additionally enable receipt of user input. Such a user interface may include a touchscreen, buttons, switches, and/or keys that enable a user to input steering commands, input a position of a target, and select a position of a target as discussed otherwise herein, all by way of non-limiting example. For example, in addition to displaying a sonar image, the display 590 may additionally in some embodiments present a chart (e.g., a navigational chart) depicting the location of the watercraft 100 within a body of water 101. In such example embodiments, the sonar system 500 can be enabled to utilize a location sensor, such as a radar or GPS sensor indicating the location of the watercraft 100 (or the transducer array 541 coupled thereto). Where a GPS is provided on the watercraft, the GPS may also be used to identify the direction of the watercraft. Using a touchscreen or cursor, for example, the user may select a position of a target on the navigational chart for which the user desires to obtain sonar data. Upon receipt of the user's selected position of the target, the processor 580 may determine the position of the target in the underwater environment (e.g., in the real world) and/or relative to the watercraft, and generate steering commands such that the steering system 570 maintains the aim of the transducer array 541 at the coordinates of the selected chart location as the location and/or orientation of the watercraft changes. Similarly, the user may input (e.g., type) a position of a target such as a geo-positional coordinates or a compass heading and the processor 580 may generate steering commands such that the steering system 570 maintains the aim of the transducer array 541 at the user-selected position as discussed otherwise herein.

In addition to setting a position of a target for the transducer array 541 to maintain within its coverage volume, certain embodiments additionally or alternatively enable direct user input regarding the aim of the transducer array 541. By way of non-limiting example, a remote control, foot pedal, or other controller operated by the user may enable the user to provide steering commands regarding the hori-zontal rotation, tilt, and/or vertical position of the coverage volume of the transducer array 541. For example, a user desiring to sweep the coverage volume horizontally may input such a command by depressing a button on a remote control to cause the transducer array 541 to obtain a sonar image of the 360° underwater environment by rotating the shaft 549 about its axis A1. Likewise, a foot pedal assembly (not shown) coupled to the processor 580 may be configured to be pivoted with a user's foot (e.g., toes and/or heel) so as to cause the shaft 549 and transducer array 541 to rotate (e.g., about axis A1). In some embodiments, pivoting the pedal in a first direction (e.g., when the user applies toe-down pressure on the pedal) may cause the steering assembly 540 to rotate the transducer array 541 in a clockwise direction, while pivoting the pedal in a second direction (e.g., when the user applies heel-down pressure on the pedal) instead causes the steering assembly 540 to rotate the transducer array 541 in a counterclockwise direction. However, other embodiments may operate autonomously or semi-autonomously to control the operation of the sonar assembly 540.

As an alternative to or in addition to receiving user input via one or more buttons associated with the sonar assembly 540 (e.g., one or more buttons on the main housing 544), a user interface associated with the display 590, a remote controller, and/or a foot pedal, for example, certain embodiments of the present teachings additionally enable the processor 580 to receive input from the user via the detection of one or more hands-free instructions by the user. By way of non-limiting example, the aim of the transducer array 541 may be controlled based on the detection of a user's body gesture, an orientation sensor associated with the user, and a voice command from the user. As noted above with respect to FIG. 1, for example, a camera 122 (or other optical or visual sensor) associated with the watercraft 100 may, with image processing, be configured to detect and interpret one or more of the user's body gestures as a steering command regarding the desired orientation of the one or more sonar transducers elements 142. Non-limiting examples of such gestures include a pointing motion, a pinching and zooming motion, and a sweeping motion. Similarly, a vibration sensor (e.g., microphone) may be configured to detect vibrations, such as vocalizations caused by the user, such that the user may control the orientation of the sonar transducer elements 142 with voice commands.

Other sensors and devices suitable for obtaining hands-free steering input from the user in accordance with embodiments of the present teachings include wearable devices (e.g., headsets, glasses, devices for the user's wrist/arms) and other orientation sensors associated with the user and/or the user's equipment such as an orientation sensor associated with the user's fishing pole or lure. With reference again to FIG. 5, in certain modes of operation, example embodiments enable the automatic, hands-free adjustment of the coverage volume of the transducer array 541 based on the user's activity. By way of example, orientation sensors may generally be configured to indicate the direction of the user's cast such that the steering assembly 540 may adjust the coverage volume accordingly. In this manner, the sonar image provided by the display 590 may automatically depict the area of the body of water 101 upon which the user is focused, for example.

FIGS. 6A-6D depict utilizing a steering system in accordance with some embodiments to adjust the orientation of the sonar transducer(s) so as to adjust the coverage volume horizontally within the body of water 101. As depicted in FIG. 6A, the sonar assembly 640 comprises a transducer array 641 of transducers that is coupled to a main housing 644 via a shaft 649. The main housing 644 may be coupled to the watercraft 100 such that the shaft 649 extends below the waterline and the transducer array 641 can emit a sonar beam 643_a_ into the water. FIG. 6B schematically depicts from above the sonar beam 643_a_ generated by the sonar assembly 640 oriented as in FIG. 6A. In accordance with certain embodiments of the present teachings, a steering system, which may at least partially be contained within the main housing 644 as discussed above with reference to FIG. 5, may be caused (e.g., under the control of one or more processors (see, e.g., 580, FIG. 5)) to adjust the facing direction of the transducer array 641 horizontally within the water 101, for example, by rotating the shaft 649 about its longitudinal axis as shown in FIG. 6C. FIG. 6D schematically depicts from above the corresponding adjusted sonar beam 643_b_ generated by the sonar assembly 640 oriented as in FIG. 6C.

With reference now to FIGS. 7A-7B, a steering system of a sonar assembly 740 in accordance with certain embodiments may additionally or alternatively be configured to adjust the orientation of the transducer array 741 by adjusting the angle of the emitting face relative to the water surface. In particular, in FIG. 7A, the emitting face of the transducer array 741 (and sonar beam 743_a_) is directed nearly straight down (e.g., toward the underwater floor). In accordance with certain embodiments of the present teachings, a steering system may be caused under the control of one or more processors to tilt the transducer array 741, for example, by rotating the transducer array 741 such that the facing direction of the sonar beam 743_b_ is angled away from the underwater floor and toward the water surface as depicted in FIG. 7B. The sonar assembly 740 may comprise a main housing 744 and a shaft 749, and these components may operate similarly to the main housing 644 and shaft 649 of the sonar assembly 640 illustrated in FIG. 6A.

With reference now to FIGS. 8A-8B, a steering system of a sonar assembly 840 in accordance with certain embodiments may additionally or alternatively be configured to adjust the coverage volume by adjusting the vertical position (e.g., depth) of the transducer array 841 beneath the water surface. Comparing FIGS. 8A and 8B, the steering system may decrease the length of the shaft 849 disposed under the water surface, thereby decreasing the depth of the emitting face of the transducer array 841. As depicted, the coverage volume of the sonar beam 843_a_ of FIG. 8A is generally deeper than the coverage volume of the sonar beam 843_b_. In accordance with various aspects of the present teachings, various embodiments of sonar systems not only provide for changing the vertical position of the transducer array 841 as in FIG. 8A-8B to adjust the coverage volume, but additionally or alternatively to adjust the vertical position in response to detection via the sonar assembly 840 of objects within the water that may damage the sonar assembly 840 or other components of the watercraft 100. By way of example, a processor may determine based on sonar data that an object in the water is being approached and could collide with the watercraft 100. In such instances, the processor may cause the steering assembly to decrease the depth of the transducer array 841 (e.g., raise the transducer array) to avoid a collision, provide a warning to the operator of a potential collision, and/or automatically cause a motor assembly (e.g., trolling motor assembly 108 of FIG. 1) to be raised to avoid damage. The sonar assembly 840 may also comprise a main housing 844, and this component may operate similarly to the main housing 644 of the sonar assembly 640 illustrated in FIG. 6A.

While various embodiments are shown where a transducer array may be attached to a shaft so that it may move up and down, this functionality may not be provided in all embodiments. For example, a transducer array may simply be provided on a primary motor assembly 105 (see FIG. 1), a trolling motor assembly 108, or a hull 104 of the watercraft 100. The transducer array may be provided in some embodiments so that it may not shift up and down relative to the watercraft 100. Where the transducer array cannot shift up and down, the coverage volume of the transducer array may be adjusted in other ways. For example, the coverage volume may be adjusted through the use of propulsive force of a motor assembly, by rotation of the transducer array about an axis, by rotation of a motor to which the transducer array is attached, by adjusting the frequency, etc.

In some embodiments, a sonar assembly 140a, 140b (see FIG. 1) may be attached to a motor assembly and the coverage volume may be adjusted by rotating the motor assembly that the sonar assembly is attached to. The motor assembly may be the primary motor assembly 105 (see FIG. 1) or the trolling motor assembly 108 (see FIG. 1). Computer program code may be configured to, when executed, cause one or more processors to cause the steering assembly 145 to adjust the coverage volume. This may be done by adjusting the motor speed of the motor assembly, by adjusting the orientation of the motor assembly relative to the watercraft 100, or by adjusting a motor speed of a second motor assembly.

In some embodiments, a motor assembly and steering system may work together to track a position of a target. For example, motor assembly instructions may be determined that may be provided to the motor assembly (e.g. the primary motor assembly 105 and/or the trolling motor assembly 108) for propelling the watercraft 100 according to a motor direction and a motor speed. Further, steering assembly instructions may be determined that may be provided to the steering assembly for adjusting the coverage volume based on the motor assembly instructions. The steering assembly instructions may be configured to cause rotation of the sonar assembly relative to the motor assembly. The motor assembly instructions may be provided to the motor assembly and the steering assembly instructions may be provided the steering assembly. In this way, a position of a target may be tracked by adjustments to the motor assembly and/or by simultaneous adjustments in the orientation of the sonar assembly.

In some embodiments, the motor assembly that the sonar assembly is attached to may only be rotated when the motor assembly is inactive. To the extent it is necessary to provide propulsive force from a motor assembly, a second motor assembly may provide this propulsive force and the motor speed of this second motor assembly may be adjusted. For example, a sonar assembly 140b may be placed on a trolling motor assembly 108, the trolling motor assembly 108 may be rotated manually, autonomously, or semi-autonomously to adjust the coverage volume, and the primary motor assembly 105 may serve as a second motor assembly to provide a propulsive force if necessary. As another example, a sonar assembly 140a may be placed on a primary motor assembly 105, the primary motor assembly 105 may be rotated manually, autonomously, or semi-autonomously to adjust the coverage volume, and the trolling motor assembly 108 may serve as a second motor assembly to provide a propulsive force if necessary.

In some embodiments, one or more processors may cause a steering system to adjust the coverage volume of a sonar beam by changing the orientation of sonar transducer elements relative to the motor assembly. For example, the sonar assembly may be attached to a motor assembly, and the coverage volume may be adjusted by rotating the sonar assembly relative to the motor assembly. This may be done by providing a sonar assembly similar to the sonar assembly 540 of FIG. 5 and attaching the sonar assembly to the motor assembly. While the sonar assembly 540 is capable of adjusting the coverage volume by rotation about the axis A1, rotation about the axis A2, and movement up and down along the axis A1, a sonar assembly attached to a motor assembly may be provided with less freedom for movement. For example, the sonar assembly may be provided so that rotation may occur only about the axes A1 and A2, the sonar assembly may be provided so that rotation may only occur about the axes A1, etc.

In some embodiments, the coverage volume for a transducer array may simply be adjusted through the operation of the primary motor assembly or the trolling motor assembly. For example, a position of a target may be provided, and the coverage volume for the transducer array may be adjusted to maintain the position of a target near the center of the coverage volume. The coverage volume may be adjusted by altering the direction and/or the motor speed of the primary motor assembly and/or the trolling motor assembly.

Additionally, in some embodiments, a watercraft may be provided having a secondary motor assembly, and the sonar assembly may be attached to the secondary motor assembly. This secondary motor assembly may include the primary motor or the trolling motor in some embodiments. The sonar assembly may be configured to rotate relative to the secondary motor assembly in some embodiments. However, in other embodiments, the sonar assembly may be attached to the secondary motor assembly so that the sonar assembly may not be permitted to rotate relative to the secondary motor assembly. In either case, the coverage volume for the sonar assembly may be adjusted by simply rotating or adjusting the position of the secondary motor assembly. In some embodiments, the secondary motor assembly may be rotated when it is not being actively used to propel the watercraft; to the extent it is necessary to propel the watercraft and rotate the secondary motor assembly at the same time, another motor assembly may be used to propel the watercraft. In this way, an easy to use sonar assembly may be provided, and the sonar assembly may be adjusted without requiring a significant number of additional parts. In some embodiments, the system may determine a route for traveling on and sonar direction instructions for maintaining a target within a sonar coverage volume as the watercraft approaches the target (e.g., the user selects a brush pile ahead and the system determines motor assembly and sonar assembly instructions, as described herein, to travel to the brush pile and keep the brush pile within the sonar image during the travel).

With reference now to FIGS. 9A-12, various methods of utilizing embodiments of sonar systems described herein are schematically depicted. With particular reference to FIG. 9A, a watercraft 100 is depicted facing due east. A user, which may desire to obtain sonar images of the compass direction of 0°, may input the compass heading (e.g., on the user interface of a display). Upon receiving the user input, a processor may adjust the orientation of the transducer array 941 such that the facing direction of the transducer array 941 is due north. Alternatively, rather than input a particular compass direction, the user may opt to "compass lock" the transducer array 941 at the orientation of FIG. 9A, for example, due to the presence of promising structures and/or fish as displayed in the sonar image or as known to the user. In any event, upon the orientation of the watercraft 100 changing (e.g., heading ESE) due to propulsion from the watercraft's trolling motor, the wind, and/or current, for example, the steering system can be caused to automatically rotate the transducer array 941 such that its facing direction remains directed due north.

With particular reference to FIGS. 10A-10B, another example embodiment of a method of utilizing sonar systems described herein is schematically depicted. As shown in FIG. 10A, a watercraft 100 is depicted facing due east. A user, upon identifying a position of a target (e.g., based on sonar data), may select the target on the sonar image, input the GPS coordinates, or select the location on a navigation chart, for example, on the user interface of a display to "target lock" the position of a target. In this manner, if the orientation of the watercraft 100 changes as in FIG. 10B (e.g., heading ESE), the steering assembly can be caused to automatically rotate the transducer array 941 such that its facing direction remains directed at the target. As illustrated, the steering assembly may adjust the coverage volume to maintain the target within the coverage volume, such as at the center of the coverage volume. The target may be a stationary object or location, or the target may be a moving object. It should be appreciated that orientations of the transducer array 941 in the "compass lock" mode (FIG. 9B) and the "location lock" mode (FIG. 10B) differ as the orientation in the "target lock" mode is adjusted for both direction and distance to the target, while the "compass lock" mode merely takes into account the desired direction. Where the target is a stationary target having an absolute position, this absolute position of the target may be saved in memory.

In some embodiments, motor assemblies may be used to adjust a coverage volume generated by a sonar beam 1043. An example of this is demonstrated in FIGS. 10C-10D. Looking first at FIG. 10C, a watercraft 100 may be provided in a first location, and the watercraft 100 may include a transducer array 941. The coverage volume for the sonar beam 1043 may be provided, and this coverage volume may be directed towards a position of a target. As illustrated in FIG. 10C, the position of a target may shift away from the center of the coverage volume for the sonar beam 1043. This may occur as a result of movement from the watercraft 100, current in the water, wind, movement of the target, etc. Computer program code may be provided to cause the steering assembly to maintain the position of a target near the center of the coverage volume for the sonar beam 1043. This may be done by identifying the position of a target in the coverage volume, determining the relative position of the target in the first coverage volume, and adjusting the coverage of the sonar beam to a second coverage volume based on the relative position of the target in the first coverage volume. The relative position of the target may be a displacement from the center of the coverage volume as illustrated in FIG. 10C, and coverage volume may be modified to reduce this displacement. In some embodiments, the coverage volume may, for example, be adjusted by activating the primary motor assembly 105 or the trolling motor assembly 108 to generate a propulsive force in the direction indicated by the arrow in FIG. 10D. While FIGS. 10C-10D illustrate the use of a motor assembly alone to maintain the position of a target in a coverage volume, one or more motor assemblies may be used in conjunction with other approaches to maintain the position of a target near the center of the coverage volume. For example the motor assembly may be activated while the transducer array may be shifted or rotated.

In some embodiments, computer program code may be configured to, when executed, cause one or more processors to cause the steering assembly to adjust the coverage volume to maintain the position of a target within the coverage volume as the watercraft 100 moves relative to the target. Some examples of this are illustrated in FIGS. 11 and 12. With particular reference now to FIG. 11, another example embodiment of a method of utilizing sonar systems described herein is schematically depicted. As shown in FIG. 11, a watercraft 100 is depicted traversing a course facing due east (as indicated by the arrow). A user, upon identifying a representation of the target (e.g., a fish, a lure, a school of fish, structure, a promising location, etc.) of the sonar image when the watercraft 100 is in the first position (on the left of FIG. 11), may select the representation of the target in the display and enter "target lock" mode. By way of example, the user may utilize a touchscreen on the display associated with the sonar system to select the representation of a target in an image (e.g. a sonar image), and the position of the target may be determined by the processor. This may include determining a correlation between the position of the representation of the target in the image (e.g., one or more corresponding pixels) and a real-world position of the target corresponding to the selected representation. In some embodiments, a processor may select the position of the target automatically, for example, based on characteristics obtained from the sonar data. It will be appreciated, for example, that different sizes and species of fish have different sonar return characteristics such that fish of a particularly desirable size/species may be recognized and automatically selected for targeting. In some embodiments, a plurality of objects within the sonar image displayed to the user may appear. For example, when the watercraft 100 is in the first position in FIG. 11, two fish may be within the coverage volume of the sonar beam 1143 such that the user may be able to select the fish having the desired characteristics (e.g., selecting the position of the target on the sonar image). Alternatively, in some embodiments, the processor may be able to automatically select the fish among a plurality of objects identified by the sonar return, based for example, on prior knowledge of the user's desired size/species.

Where the target is a moving target (e.g. a fish), one or more processors may utilize image processing or other similar techniques to redetermine the position of the target at regularly occurring intervals, and this may ensure that the position of the moving target is accurately maintained. In some embodiments, multiple cameras, sonar transducer elements, transducer arrays, etc. may be used to permit the distance to the target to be determined.

As depicted in the second (middle) and third (right) positions as the watercraft 100 proceeds east, the sonar system may be configured to automatically adjust the orientation of the transducer array 941 to maintain the target within the coverage volumes for the sonar beams 1143', 1143". In some embodiments, the steering assembly may adjust the coverage volumes for the sonar beams 1143', 1143" to maintain the position of the target at the center of the coverage volumes. Notably, the non-targeted object that was present in the first sonar image is outside of the coverage angle in the second and third corresponding sonar image as the processor has caused the steering assembly to adjust for the position of the selected target. It will also be appreciated that where the target in FIG. 11 is stationary, the adjustments to the orientation of transducer array 941 may be identical. However, if the target of FIG. 11 was moving, the "target lock" mode can provide adjustments to the coverage volume so as to account for the movement of the object, for example, by determining deviations in the sonar data across a series of sonar returns from where a stationary object would be expected to calculate a speed and/or direction of travel of the object.

While the target is stationary in FIG. 11, the sonar system may be used to track a moving object. An example of this is illustrated in FIG. 12, where another example embodiment of a method of utilizing sonar systems described herein is schematically depicted. As shown in FIG. 12, a watercraft 100 is depicted in a first position (on the left of FIG. 12) when a moving target is identified based on the sonar data (e.g., automatically or due to the input of a user). In this example, a user may select the position of the target and enter a tracking and following mode such that the processor(s) of the sonar system not only adjusts the orientation and/or vertical position of the transducer array 941 to maintain the object within the coverage volume (e.g., via steering assembly instructions), but is also configured to control a motor assembly to propel the watercraft 100 relative to the moving target (e.g., via motor assembly instructions). For example, the primary motor assembly 105 (see FIG. 1) or the trolling motor assembly 108 (see FIG. 1) may be activated to assist in maintaining the position of the target in the coverage volume. In some embodiments, a steering assembly may adjust the coverage volumes to maintain the position of the target at the center of the coverage volumes. By way of example, the processor of certain embodiments of the sonar systems described herein may, in addition to determining and providing steering assembly instructions, determine and provide motor assembly instructions to cause the motor assembly to operate with a desired thrust and direction, such as to maintain the watercraft 100 within a predetermined threshold distance of the moving object, such as 5 ft., 10 ft., or other suitable distance. In this manner, some embodiments of sonar systems in accordance with the present teachings may enable the automatic tracking of a moving object, for example, to maintain the watercraft 100 within casting distance of the position of the target.

In various embodiments, a user may select a representation of the target on a display, and the systems described herein may lock on the selected position of the target. FIGS. 13A-13B, 14-15, and 16 illustrate various displays that enable this selection.

Looking first at FIG. 13A, a display 1360 is illustrated that is presenting an image 1374. Here, the image 1374 is in the form of a live sonar image. As illustrated, a user may review the image 1374 to identify a representation of a target 1376. Relevant targets 1376 may, for example, be areas where a desirable type of fish may frequently populate. In the illustrated example of FIG. 13A, the target 1376 is a brush pile, and the user may target the representation of the brush pile in the hopes of increasing his or her chances of success in catching the desired type of fish. Other targets may be a reef, a ridge, a structure, or other stationary items. However, targets may also include moving objects such as one or more fish or other underwater animals that are represented in a sonar image.

Once the user has identified a representation of the target 1376, the user may provide an input directed to the representation of the target 1376, and this input may be used to determine a position 1378 of the target 1376. The target 1376 may be selected in a variety of ways. For example, selection may be made by touch-input, by use of user-interface buttons, by oral instructions (e.g., by providing a precise latitude and longitude), by loading a location that was previously saved in memory by the user or by another, or by automatic detection of predetermined criteria. However, other selection approaches are also contemplated. Once the target 1376 is selected, the system may determine a position 1378 of the target in the underwater environment (e.g., via range, depth, and/or GPS coordinates relative to the watercraft (and the watercraft's known coordinates). Thereafter, a steering assembly on the watercraft 1382 may adjust the coverage volume to maintain the position 1378 within the coverage volume 1384. Additionally, in some embodiments, target information 1380 may be displayed proximate to the representation of the target.

FIG. 13B illustrates an example selection approach where the image 1374 is a chart revealing the water depth at various locations. As illustrated, a user may review the chart and make a selection of a representation of a target. From this selection, a position 1378 of the target may be determined, and a steering assembly on the watercraft 1382 may adjust the coverage volume 1384 to maintain the position 1378 within the coverage volume 1384. As illustrated in FIG. 13B, a depiction of the coverage volume 1384 may be presented on the display 1360.

FIGS. 14-15 provide further examples of potential selection approaches. Looking first at FIG. 14, a forward-scan sonar image is utilized as the image 1474 on the display 1460. A user may review the image 1474 and determine a target 1476. Here, the target 1476 is a ridge. Once the user has identified the target 1476, the user may select the representation of the target 1476 on the display 1460. The position 1478 of the selected target 1476 may be determined thereafter. In some embodiments, the position 1478 may be marked on the screen as illustrated in FIG. 15. However, the position 1478 may be represented on the screen in a variety of ways (e.g., through highlighting, through markings having other shapes, etc.). Once the position 1478 is determined, a steering assembly on the watercraft may adjust the coverage volume 1484 to maintain the position 1478 within the coverage volume 1484.

FIG. 16 provides an example of another potential selection approach where the image 1674 presented on the display 1660 is a 360 degree image. In this image 1674, a coverage volume 1684 may be depicted to show the direction of one or more sonar transducer elements. A user may select a representation of the target on the display 1660 to provide a position 1678 of the target. This position 1678 may be presented as illustrated in FIG. 16. Once this position 1678 has been provided, the system(s) described herein may adjust the coverage volume 1684 to maintain the target within the coverage volume.

Example System Architecture

FIG. 17 illustrates a block diagram of an example system 1700 according to various embodiments of the present invention described herein. The illustrated system 1700 includes a marine electronic device 1760 (e.g., a device mounted to watercraft, a device connected to a watercraft network, any device usable in the marine environment (such as a smartphone, tablet, laptop, etc.), among others). The system 1700 may comprise numerous marine devices. As shown in FIG. 17, one or more transducer arrays 1741, 1741', 1741" may be provided. A radar 1716, a primary motor assembly 1705, a trolling motor assembly 1708, a steering assembly 1740 (although, in some embodiments, the steering assembly 1740 may be the same steering assembly utilized for the primary motor 1705 or trolling motor 1708), and additional sensors/devices 1761 may also be provided as marine devices, but other marine devices may be provided as well. In some embodiments, the steering assembly 1740 may include a steering system (e.g. 570, FIG. 5) and one of the primary motor assembly 1705 and the trolling motor assembly 1708. One or more marine devices may be implemented on the marine electronic device 1760. For example, a position sensor 1762, a direction sensor 1720, an autopilot 1763, and other sensors 1764 may be provided within the marine electronic device 1760. These marine devices can be integrated within the marine electronic device 1760, integrated on a watercraft at another location and connected to the marine electronic device 1760, and/or the marine devices may be implemented at a remote device 1765 in some embodiments. The system 1700 may include any number of different systems, modules, or components, and each of these may comprise any device or means embodied in either hardware, software, or a combination of hardware and software configured to perform one or more corresponding functions described herein.

The marine electronic device 1760 may include at least one processor 1766, a memory 1767, a communication interface 1768, a user interface 1769, a display 1790, autopilot 1763, and one or more sensors (e.g. position sensor 1762, direction sensor 1720, other sensors 1764). One or more of the components of the marine electronic device 1760 may be located within a housing or could be separated into multiple different housings (e.g., be remotely located).

The processor(s) 1766 may be any means configured to execute various programmed operations or instructions stored in a memory device (e.g., memory 1767) such as a device or circuitry operating in accordance with software or otherwise embodied in hardware or a combination of hardware and software (e.g. a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the processor(s) 1766 as described herein. For example, the processor(s) 1766 may be configured to analyze sonar return data for various features/functions described herein (e.g., generate a sonar image, determine an object and/or object position, etc.). One or more microprocessors, controllers, or microcontrollers may serve as a processor in some embodiments.

In some embodiments, the processor(s) 1766 may be further configured to implement signal processing. In some embodiments, the processor(s) 1766 may be configured to perform enhancement features to improve the display characteristics of data or images, collect or process additional data, such as time, temperature, GPS information, waypoint designations, or others, or may filter extraneous data to better analyze the collected data. The processor(s) 1766 may further implement notices and alarms, such as those determined or adjusted by a user, to reflect proximity of other objects (e.g., represented in sonar data), to reflect proximity of other vehicles (e.g. watercraft), approaching storms, etc.

In some embodiments, the memory 1767 may include one or more non-transitory storage or memory devices such as, for example, volatile and/or non-volatile memory that may be either fixed or removable. The memory 1767 may be configured to store instructions, computer program code, sonar data, and additional data such as radar data, chart data, location/position data in a non-transitory computer readable medium for use, such as by the at least one processor 1766 for enabling the marine electronic device 1760 to carry out various functions in accordance with example embodiments of the present invention. For example, the memory 1767 could be configured to buffer input data for processing by the at least one processor 1766. Additionally or alternatively, the memory 1767 could be configured to store instructions for execution by the at least one processor 1766.

In some embodiments, computer program code may be provided, and this may be provided in memory 1767 in some embodiments. Computer program code may be configured to cause the processor 1766 to take certain actions. For example, the computer program code may cause the processor 1766 to cause the steering assembly to adjust a coverage volume to maintain a position of the target at the center of the coverage volume. This may take into account, for example, the current direction of the surrounding body of water 101 or the speed of the watercraft 100.

The communication interface 1768 may be configured to enable communication to external systems (e.g. an external network 1770). In this manner, the marine electronic device 1760 may retrieve stored data from a remote device 1765 via the external network 1770 in addition to or as an alternative to the onboard memory 1767. Additionally or alternatively, the marine electronic device 1760 may transmit or receive data, such as sonar signal data, sonar return data, sonar image data, or the like to or from transducer arrays 1741, 1741', 1741". In some embodiments, the marine electronic device 1760 may also be configured to communicate with other devices or systems (such as through the external network 1770 or through other communication networks, such as described herein). For example, the marine electronic device 1760 may communicate with a propulsion system of the watercraft 100 (e.g., for autopilot control); a remote device (e.g., a user's mobile device, a handheld remote, etc.); or another system. Using the external network 1770, the marine electronic device may communicate with and send and receive data with external sources such as a cloud, server, etc. The marine electronic device may send and receive various types of data. For example, the system may receive weather data, data from other fish locator applications, alert data, among others. However, this data is not required to be communicated using external network 1770, and the data may instead be communicated using other approaches, such as through a physical or wireless connection via the communications interface 1768.

The communications interface 1768 of the marine electronic device 1760 may also include one or more communications modules configured to communicate with one another in any of a number of different manners including, for example, via a network. In this regard, the communications interface 1768 may include any of a number of different communication backbones or frameworks including, for example, Ethernet, the NMEA 2000 framework, GPS, cellular, Wi-Fi, or other suitable networks. The network may also support other data sources, including GPS, autopilot, engine data, compass, radar, etc. In this regard, numerous other peripheral devices (including other marine electronic devices or sonar transducer assemblies) may be included in the system 1700.

The position sensor 1762 may be configured to determine the current position and/or location of the marine electronic device 1760 (and/or the watercraft 100). For example, the position sensor 1762 may comprise a GPS, bottom contour, inertial navigation system, such as machined electromagnetic sensor (MEMS), a ring laser gyroscope, or other location detection system. Alternatively or in addition to determining the location of the marine electronic device 1760 or the watercraft 100, the position sensor 1762 may also be configured to determine the position and/or orientation of an object outside of the watercraft 100.

The display 1790 (e.g. one or more screens) may be configured to present images and may include or otherwise be in communication with a user interface 1769 configured to receive input from a user directed to a representation of a target in the sonar image. The display 1790 may be, for example, a conventional LCD (liquid crystal display), a touch screen display, mobile device, or any other suitable display known in the art upon which images may be displayed.

In some embodiments, the display 1790 may present one or more sets of data (or images generated from the one or more sets of data). Such data includes, for example, chart data, radar data, sonar data, weather data, location data, position data, orientation data, sonar data, or any other type of information relevant to the watercraft. Sonar data may be received from one or more transducer arrays 1741 or from sonar devices positioned at other locations, such as remote from the watercraft. Additional data may be received from marine devices such as a radar 1716, a primary motor 1705 or an associated sensor, a trolling motor 1708 or an associated sensor, steering assembly 1740, an autopilot, a position sensor 1762, a direction sensor 1720, other sensors 1764, a remote device 1765, onboard memory 1767 (e.g., stored chart data, historical data, etc.), or other devices.

In some further embodiments, various sets of data, referred to above, may be superimposed or overlaid onto one another and presented on the display 1790. For example, a route may be applied to (or overlaid onto) a chart (e.g. a map or navigational chart). Additionally or alternatively, depth information, weather information, radar information, sonar information, or any other navigation system inputs may be applied to one another.

The user interface 1769 may include, for example, a keyboard, keypad, function keys, mouse, scrolling device, input/output ports, touch screen, or any other mechanism by which a user may interface with the system.

Although the display 1790 of FIG. 17 is shown as being directly connected to the at least one processor 1766 and within the marine electronic device 1760, the display 1790 could alternatively be remote from the at least one processor 1766 and/or marine electronic device 1760. Likewise, in some embodiments, the position sensor 1762 and/or user interface 1769 could be remote from the marine electronic device 1760.

The marine electronic device 1760 may include one or more other sensors/devices 1764, such as configured to measure or sense various other conditions. The other sensors/devices 1764 may include, for example, an air temperature sensor, a water temperature sensor, a current sensor, a light sensor, a wind sensor, a speed sensor, or the like.

The transducer arrays 1741, 1741', 1741" illustrated in FIG. 17 may each include one or more sonar transducer array(s) and/or elements 1742 (e.g., of any type), such as described herein. In some embodiments, additional separate sonar transducer elements (arranged to operate alone, in an array, or otherwise) may be included. The transducer arrays 1741, 1741', 1741" may also include a sonar signal processor or other processor (although not shown) configured to perform various sonar processing. In some embodiments, the processor (e.g., at least one processor 1766 in the marine electronic device 1760, a controller (or processor portion) in the transducer arrays 1741, or a remote controller—or combinations thereof) may be configured to filter sonar return data and/or selectively control sonar transducer element(s) 1742. For example, various processing devices (e.g., a multiplexer, a spectrum analyzer, A-to-D converter, etc.)

may be utilized in controlling or filtering sonar return data and/or transmission of sonar signals from the sonar transducer element(s) 1742.

The transducer arrays 1741 may include one or more other systems, such as various sensor(s) 1771. For example, the transducer arrays 1741 may include an orientation sensor, such as gyroscope or other orientation sensor (e.g., accelerometer, MEMS, direction, etc.) that can be configured to determine the relative orientation and/or direction of the transducer arrays 1741 and/or the one or more sonar transducer array(s) and/or element(s) 1742—such as with respect to the watercraft. Such information may be used in conjunction with and/or for, for example, the steering assembly 1740, such as to determine the current vertical position and/or orientation of the transducer array 1741 that is part of various sonar assemblies (e.g., the sonar assemblies 140, 640, 740, 840) described herein. In some embodiments, additionally or alternatively, other types of sensor(s) are contemplated, such as, for example, a water temperature sensor, a current sensor, a light sensor, a wind sensor, a speed sensor, or the like.

The components presented in FIG. 17 may be rearranged to alter the connections between components. For example, in some embodiments, a marine device outside of the marine electronic device 1760, such as the radar 1716, may be directly connected to the at least one processor 1766 rather than being connected to the communication interface 1768. Additionally, sensors and devices implemented within the marine electronic device 1760 may be directly connected to the communications interface 1768 in some embodiments rather than being directly connected to the at least one processor 1766.

Example Flowchart(s) and Operations

Some embodiments of the present invention provide methods, apparatus, and computer program products related to the presentation of information according to various embodiments described herein. Various examples of the operations performed in accordance with embodiments of the present invention will now be provided with reference to FIGS. 18-22. FIGS. 18-22 present flowcharts with example method(s) of adjusting the coverage volume of one or more sonar transducer elements according to various embodiments described herein. In some embodiments, a marine electronic device 1760 (FIG. 17) may comprise one or more processors that perform the functions shown in FIGS. 18-22. Further, these methods may be provided on software which runs on a central server that is at a remote location away from the watercraft, and the remote server may communicate with a processor or a similar component on the watercraft. Additionally, the methods could be integrated into a software update that may be installed onto existing hardware, or the methods may be integrated into the initial software or hardware provided in a watercraft, server, various components described herein, etc.

FIG. 18 is a flowchart of an example method 1800 for adjusting (e.g., automated or non-manually adjusting) the coverage volume of one or more sonar transducer elements, in accordance with some embodiments discussed herein. The operations illustrated in and described with respect to FIG. 18 (and FIGS. 19-22) may, for example, be performed by, with the assistance of, and/or under the control of one or more of the processor 1766, memory 1767, communication interface 1768, user interface 1769, position sensor 1762, direction sensor 1720, other sensors 1764, autopilot 1763, transducer array 1741, 1741', 1741", steering assembly 1740, display 1790, radar 1716, primary motor 1705, trolling motor 1708, additional sensors 1761, and/or external network 1770/remote device 1765.

At operation 1802, the method comprises operating one or more sonar transducer elements (e.g., in an array). This may entail causing the one or more sonar transducer elements to emit one or more sonar beams into the underwater environment. At operation 1804, the method comprises receiving sonar return data from the one or more sonar transducer elements, such as from a coverage angle. At operation 1806, the method comprises generating a sonar image, such as a live sonar image. At operation 1808, the method comprises receiving user input regarding a desired adjustment to the coverage volume of the sonar transducer element(s). At operation 1810, the method comprises causing a steering assembly to adjust the orientation of the sonar transducer element(s) in accordance with the user input. In some embodiments, the adjustment may be automatic such as to occur without direct and/or intermittent user input (e.g., when acting according to a software algorithm, when performing a sweep, when tracking a position of a target, when on one of the various "lock" examples, etc.). In some embodiments, the method comprises, at operation 1812, updating the sonar image with the sonar data obtained at the adjusted coverage volume.

FIG. 19 is a flowchart of an example method 1900 for adjusting (e.g., automated or non-manually adjusting) the coverage volume of one or more sonar transducer elements, in accordance with some embodiments discussed herein. At operation 1902, the method comprises determining a position of a desired target of one or more sonar transducer elements. The selection of the target may be received as an input from a user, and the input may be directed to a representation of a target in a sonar image presented on a display. Furthermore, the position of the target may be determined using the provided input. At operation 1904, the method comprises causing a steering assembly to adjust the orientation of the sonar transducer element(s) such that the position of the desired target is within the coverage volume of the sonar transducer element(s). In some embodiments, the sonar assembly may be attached to the motor assembly, and the adjustment of the orientation of the sonar transducer elements(s) may be completed by changing the orientation of a primary motor assembly or a trolling motor assembly relative to the watercraft. At operation 1906, the method comprises operating the sonar transducer element(s) to direct one or more sonar beams toward the position of the target. At operation 1908, the method comprises receiving sonar return data from the one or more sonar transducer elements from a coverage volume including the target. At operation 1910, the method comprises generating a sonar image, such as a live sonar image. At operation 1912, the method comprises causing the steering assembly to adjust the orientation of the sonar transducer element(s) to maintain the position of the target within the coverage volume due to movement of the watercraft and target relative to one another. At operation 1914, the method comprises updating the sonar image with the sonar data obtained at the adjusted coverage volume. In some embodiments, at operation 1916, the method comprises causing the steering assembly to adjust and/or one or more of the motor assemblies to generate movement of the watercraft for tracking the target.

FIG. 20 illustrates a flowchart of an example method 2000 for operating a sonar system. At operation 2002, the sonar may be operated. This may be done by causing one or more sonar transducer elements to emit one or more sonar beams into an underwater environment. At operation 2004, sonar return data may be received from the coverage volume of the sonar transducer element(s). At operation 2006, a sonar image may be generated, and this sonar image may represent the coverage volume of the underwater environment based on the sonar return data. At operation 2008, input may be received from the user that is directed to a representation of a target in the sonar image. This input may be received, for example, at the display 160, using a camera 122, using input buttons at the helm, using a microphone that is capable of receiving verbal commands from the user, etc. At operation 2010, a position of a target in the underwater environment may be determined based on the user's input. At operation 2012, the coverage volume may be adjusted to maintain the target in the coverage volume. This coverage volume may be adjusted in response to movement (including linear and/or angular movement) of the watercraft relative to the position of the target. This may be done using a steering assembly.

The coverage volume may be adjusted at operation 2012 in a variety of ways. For example, in some embodiments, the sonar assembly may comprise a shaft defining a first end and a second end. The first end of the shaft may be attached to the watercraft, and the one or more sonar transducer elements may be attached to the second end of the shaft. Where this shaft is used, the steering assembly may adjust the coverage volume to maintain a position of the target in the coverage volume by (i) rotating the one or more sonar transducer elements about a longitudinal axis of the shaft, (ii) tilting the one or more sonar transducer elements, (iii) adjusting the vertical position of the one or more sonar transducer elements within the underwater environment, and/or (iv) propelling the watercraft using the motor assembly.

In some embodiments, the one or more sonar transducer elements in a sonar transducer assembly may be attached to a hull of a watercraft. Where this is the case, the steering assembly may be used to adjust the coverage volume at operation 2012 by (i) tilting and/or rotating the sonar transducer elements, and/or (ii) propelling the watercraft using the motor assembly.

In some embodiments, the one or more sonar transducer elements in a sonar transducer assembly may be provided in a secondary motor assembly. Where this is the case, the steering assembly may be used to adjust the coverage volume at operation 2012 by (i) tilting and/or rotating the sonar assembly relative to the secondary motor assembly; (ii) rotating and/or adjusting the position of the secondary motor assembly; and/or (iii) propelling the watercraft using a motor assembly.

FIG. 21 illustrates a flowchart of another example method 2100 for operating a sonar system. At operation 2102, the motor assembly instructions are determined. These motor assembly instructions may include a motor direction and/or a motor speed of a primary motor assembly or the trolling motor assembly. However, an alternative instruction may be provided to adjust the speed. For example, the motor speed may be adjusted by setting a power level for the motor assembly. At operation 2104, steering assembly instructions may be determined for adjusting the orientation of the sonar assembly, and these instructions may be determined based on the motor assembly instructions. At operation 2106, the motor assembly instructions may be provided to the motor assembly and the steering assembly instructions may be provided to the steering assembly. At operation 2108, the position of the target may be tracked through adjustments to the motor assembly using the motor assembly instructions and through adjustments to the orientation of the sonar assembly using the steering assembly instructions. Adjustments to the motor assembly and adjustments to the orientation of the sonar assembly may occur simultaneously.

FIG. 22 illustrates a flowchart of another example method 2200 for operating a sonar system. At operation 2202, the displacement of the position of the target from the center of the coverage volume may be determined. In some embodiments, this displacement may be a linear displacement, but this displacement may be an angular displacement in some embodiments. At operation 2204, a determination may be made to evaluate whether the displacement is greater than a specified threshold. If the displacement is greater than the specified threshold, then the steering assembly may be caused to operate in a first mode where the motor assembly is active to reduce the displacement of the target at operation 2206. If the displacement is less than or equal to the specified threshold, then the steering assembly may be caused to operate in a second mode where the motor assembly is inactive at operation 2208. In this second mode, the steering assembly may be active to reduce any displacement of the target. In some embodiments, the steering assembly may be active in the first mode to cause adjustments to the orientation of the sonar assembly relative to the motor assembly. However, in other embodiments, the displacement may be reduced solely through the operation of a motor assembly. Notably, in some embodiments, the thresholds may be switched such that if the displacement is greater than the specified threshold, then the steering assembly may operate in the second mode, and, likewise, if the displacement is equal to or less than the specified threshold, then the steering assembly may operate in the first mode. Other thresholds and variations are also contemplated.

FIGS. 18-22 illustrates flowcharts of a system, method, and computer program product according to various example embodiments. It will be understood that each block of the flowcharts, and combinations of blocks in the flowcharts, may be implemented by various means, such as hardware and/or a computer program product comprising one or more computer-readable mediums having computer readable code stored thereon. For example, one or more of the procedures described herein may be embodied by computer readable code of a computer program product. In this regard, the computer program product(s) which embody the procedures described herein may be stored by, for example, the memory 1767 and executed by, for example, the processor 1766. As will be appreciated, any such computer program product may be loaded onto a computer or other programmable apparatus (for example, a marine electronic device 1760) to produce a machine, such that the computer program product including the computer readable code which execute on the computer or other programmable apparatus creates means for implementing the functions specified in the flowchart block(s). Further, the computer program product may comprise one or more non-transitory computer-readable mediums on which the computer readable code may be stored such that the one or more computer-readable memories can direct a computer or other programmable device (for example, a marine electronic device 1760) to cause a series of operations to be performed on the computer or other programmable apparatus to produce a computer-implemented process such that the computer readable code which execute on the computer or other programmable apparatus implement the functions specified in the flowchart block(s).

Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

That which is claimed:

1. A sonar system for a watercraft in a body of water, the sonar system comprising:
   a sonar assembly configured to attach to the watercraft such that the sonar assembly moves in a fixed relationship with the watercraft, the sonar assembly comprising one or more sonar transducer elements, wherein the one or more sonar transducer elements are configured to transmit one or more sonar beams into an underwater environment;
   a steering assembly configured to cause rotation of a facing direction of the sonar assembly;
   a display;
   one or more processors; and
   a memory including computer program code configured to, when executed, cause the one or more processors to:
      cause the one or more sonar transducer elements to emit one or more sonar beams into the underwater environment;
      receive sonar return data from a coverage volume of the one or more sonar transducer elements;
      generate a sonar image of the coverage volume of the underwater environment based on the sonar return data;
      receive an input from a user directed to a representation of a target in the sonar image;
      determine a position of the target in the underwater environment based on the input; and
      cause the steering assembly to adjust the coverage volume, based on the position of the target in the underwater environment and based on an upcoming or a current direction or speed of the watercraft, to maintain the target within the coverage volume as the watercraft moves in the body of water relative to the target,
   wherein the watercraft includes a motor assembly attached thereto and configured to propel the watercraft in the body of water, wherein the sonar assembly is attached to the motor assembly, wherein the computer program code is configured to, when executed, cause one or more processors to cause the steering assembly to adjust the coverage volume by changing the orientation of the motor assembly relative to the watercraft, wherein the motor assembly is at least one of a primary motor assembly or a trolling motor assembly, wherein rotation of the sonar assembly is generated by changing the orientation of the motor assembly relative to the watercraft.

2. The sonar system of claim 1, wherein the computer program code is configured to, when executed, cause one or more processors to cause the steering assembly to:

adjust a motor speed of the motor assembly;

adjust an orientation of the motor assembly; or adjust a motor speed of a second motor assembly.

3. The sonar system of claim 1, wherein the computer program code is further configured to, when executed, cause the one or more processors to:

determine motor assembly instructions to provide to the motor assembly for propelling the watercraft according to a motor direction and a motor speed;

determine steering assembly instructions to provide to the steering assembly for adjusting the orientation of the sonar assembly based on the motor assembly instructions;

provide the motor assembly instructions to the motor assembly and the steering assembly instructions to the steering assembly; and track the position of the target through adjustments to the motor assembly using motor assembly instructions and through simultaneous adjustments in an orientation of the sonar assembly using steering assembly instructions.

4. The sonar system of claim 1, wherein the computer program code is configured to, when executed, cause the steering assembly to adjust the coverage volume to maintain the target in the underwater environment at a center of the coverage volume, wherein the steering assembly is configured to adjust an orientation of the motor assembly, wherein the one or more sonar transducer elements are attached to the motor assembly, wherein the steering assembly is configured to cause the steering assembly to adjust the coverage volume by rotating the motor assembly, based on the position of the target in the underwater environment, to maintain the target within the coverage volume as the watercraft moves relative to the target only when the motor assembly is inactive.

5. The sonar system of claim 1, wherein the target is at least one of a stationary target or a moving target, wherein the computer program code is configured to, when executed, cause the one or more processors to utilize image processing to redetermine a current position of the target in the underwater environment at regularly occurring intervals.

6. The sonar system of claim 1, wherein the computer program code is configured to, when executed, cause the one or more processors to adjust the coverage volume to maintain the target in the underwater environment at a center of the coverage volume by:

causing the steering assembly to operate in a first mode when a displacement of the target from the center of the coverage volume exceeds a specified threshold; and causing the steering assembly to operate in a second mode when a displacement of the target from the center of the coverage volume is less than or equal to the specified threshold, wherein, in the first mode, the motor assembly is active to reduce the displacement of the target, and wherein, in the second mode, the motor assembly is inactive and the steering assembly is active to reduce the displacement of the target.

7. The sonar system of claim 1, wherein each of the one or more sonar transducer elements are configured to operate at a fixed phase shift and vary in frequency so as to beamform multiple sonar return beams between a first range of angles in the fore-to-aft direction and a second range of angles in the fore-to-aft direction, wherein the sonar image is a two-dimensional live sonar image that is formed of sonar return data from each of the multiple sonar return beams, wherein the sonar return data used to form the two-dimensional live sonar image was received at substantially a same time by the one or more sonar transducer elements.

8. The sonar system of claim 7, wherein a sonar transducer element of the one or more sonar transducer elements has a first coverage volume, wherein the memory including computer program code is configured to, when executed, cause the one or more processors to:

identify the target in the first coverage volume;

determine a relative position of the target in the first coverage volume; and adjust coverage of the sonar beam to a second coverage volume based on the relative position of the target in the first coverage volume.

9. The sonar system of claim 8, wherein the relative position of the target includes a first displacement, wherein the first displacement is a distance between a center of the first coverage volume and the target, wherein a second displacement is a distance between a center of the second coverage volume and the target, and wherein the second displacement is less than the first displacement.

10. The sonar system of claim 1, wherein the computer program code is further configured to, when executed, cause the one or more processors to:

cause the steering assembly to cause the sonar transducer element to twitch about an axis to expand the coverage volume.

11. The sonar system of claim 10, wherein the computer program code is configured to, when executed, cause the one or more processors to:

receive a user input; and activate, upon the user input, the steering assembly to cause the sonar transducer element to twitch about the axis to expand the coverage volume.

12. The sonar system of claim 1, wherein the target is a stationary target having an absolute position in the underwater environment, wherein the computer program code is configured to, when executed, cause the one or more processors to save the absolute position in the underwater environment of the target in the memory.

13. The sonar system of claim 1, wherein the computer program code is configured to, when executed, cause the steering assembly to adjust the coverage volume to maintain the target in the underwater environment at a center of the coverage volume.

14. A sonar system for a watercraft in a body of water, comprising:

a sonar assembly configured to attach to the watercraft such that the sonar assembly moves in a fixed relationship with the watercraft, wherein the watercraft has a motor assembly configured to propel the watercraft to travel along a direction of travel in the body of water, the sonar assembly comprising one or more sonar transducer elements, wherein the one or more sonar transducer elements are configured to transmit one or more sonar beams into an underwater environment;

a steering assembly configured to cause rotation of a facing direction of at least one of the sonar assembly or the motor assembly;

a display;

one or more processors; and a memory including computer program code configured to, when executed, cause the one or more processors to:

cause the one or more sonar transducer elements to emit one or more sonar beams into the underwater environment;

receive sonar return data from a coverage volume of the one or more sonar transducer elements;

generate a sonar image of the coverage volume of the underwater environment based on the sonar return data;

receive an input from a user directed to a representation of a target in the sonar image;

determine a position of the target in the underwater environment based on the input; and cause the steering assembly to adjust the coverage volume, based on the position of the target in the underwater environment and based on an upcoming or a current direction or speed of the watercraft, to maintain the target within the coverage volume as the watercraft moves relative to the target, wherein the sonar assembly is attached to the motor assembly, wherein the computer program code is configured to, when executed, cause one or more processors to cause the steering assembly to adjust the coverage volume by changing the orientation of the motor assembly relative to the watercraft, wherein the motor assembly is at least one of a primary motor assembly or a trolling motor assembly, wherein rotation of the sonar assembly is generated by changing the orientation of the motor assembly relative to the watercraft.

15. The sonar system of claim 14, wherein the sonar assembly comprises a shaft defining a first end and a second end, wherein the first end of the shaft is attached to the watercraft, wherein the one or more sonar transducer elements are attached to the second end of the shaft, wherein the computer program code is configured to, when executed, cause the one or more processors to:

cause the steering assembly to adjust the coverage volume to maintain the target within the coverage volume by performing at least one of (i) rotating the one or more sonar transducer elements about a longitudinal axis of the shaft, (ii) tilting the one or more sonar transducer elements, (iii) adjusting the vertical position of the one or more sonar transducer elements within the underwater environment, or (iv) propelling the watercraft using the motor assembly.

16. A trolling motor assembly for a watercraft in a body of water, the trolling motor assembly comprising:

a trolling motor;

a sonar assembly comprising one or more sonar transducer elements, wherein the one or more sonar transducer elements are configured to transmit one or more sonar beams into an underwater environment;

a steering assembly configured to cause rotation of a facing direction of at least one of the sonar assembly or the trolling motor;

one or more processors; and a memory including computer program code configured to, when executed, cause the one or more processors to:

cause the one or more sonar transducer elements to emit one or more sonar beams into the underwater environment;

receive sonar return data from a coverage volume of the one or more sonar transducer elements;

generate a sonar image of the coverage volume of the underwater environment based on the sonar return data; and cause the steering assembly to adjust the coverage volume to maintain a target within the coverage volume as the watercraft moves relative to the target based on a position of the target in the underwater environment and based on an upcoming or a current direction or speed of the watercraft, wherein the trolling motor is configured to be attached to the watercraft such that the sonar assembly moves in a fixed relationship with the watercraft, and wherein the trolling motor is configured to propel the watercraft in the body of water, wherein the computer program code is configured to, when executed, cause one or more processors to cause the steering assembly to adjust the coverage volume by changing the orientation of the trolling motor relative to the watercraft, wherein rotation of the sonar assembly is generated by changing the orientation of the trolling motor relative to the watercraft.

17. A method for adjusting a coverage volume of a steering assembly on a watercraft in a body of water, the method comprising:

providing a sonar system having a sonar assembly with one or more sonar transducer elements, wherein the sonar assembly is configured to attach to the watercraft such that the sonar assembly moves in a fixed relationship with the watercraft, wherein the sonar assembly is attached to a motor assembly of the watercraft, wherein the motor assembly is at least one of a primary motor assembly or a trolling motor assembly;

providing a steering assembly configured to cause rotation of a facing direction of the sonar assembly, wherein rotation of the facing direction of the sonar assembly is generated by changing an orientation of the motor assembly relative to the watercraft;

causing the one or more sonar transducer elements to emit one or more sonar beams into the underwater environment;

receiving sonar return data from a coverage volume of the one or more sonar transducer elements;

generating a sonar image of the coverage volume of the underwater environment based on the sonar return data;

receiving an input from a user directed to a representation of a target in the sonar image;

determining a position of the target in the underwater environment based on the input; and causing the steering assembly to adjust the coverage volume, based on the position of the target in the underwater environment and based on an upcoming or a current direction or speed of the watercraft, to maintain the target within the coverage volume as the watercraft moves relative to the target by changing the orientation of the motor assembly relative to the watercraft.

* * * * *